(12) United States Patent
Lu et al.

(10) Patent No.: US 8,008,920 B2
(45) Date of Patent: Aug. 30, 2011

(54) METHOD AND APPARATUS FOR UTILIZING TIME DIVISION MULTIPLE WAVEFORM TRANSMITTING

(75) Inventors: Xinyou Lu, Missouri City, TX (US); Scott C. Hornbostel, Houston, TX (US); Dennis E. Willen, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 775 days.

(21) Appl. No.: 11/992,607

(22) PCT Filed: Aug. 28, 2006

(86) PCT No.: PCT/US2006/033695
§ 371 (c)(1),
(2), (4) Date: Mar. 26, 2008

(87) PCT Pub. No.: WO2007/046952
PCT Pub. Date: Apr. 26, 2007

(65) Prior Publication Data
US 2009/0243613 A1  Oct. 1, 2009

Related U.S. Application Data

(60) Provisional application No. 60/726,902, filed on Oct. 14, 2005.

(51) Int. Cl.
*G01V 3/02* (2006.01)
*G01V 3/00* (2006.01)

(52) U.S. Cl. .................................. 324/357; 324/354

(58) Field of Classification Search .......... 324/334–335, 324/354, 357, 365
See application file for complete search history.

(56) References Cited

U.S. PATENT DOCUMENTS

| 5,357,253 A | 10/1994 | Van Etten et al. ............... 342/22 |
| 5,955,884 A * | 9/1999 | Payton et al. .................. 324/339 |
| 2003/0038634 A1* | 2/2003 | Strack ........................... 324/323 |
| 2005/0077902 A1* | 4/2005 | MacGregor et al. .......... 324/334 |
| 2007/0177705 A1 | 8/2007 | Lu et al. ....................... 375/377 |

FOREIGN PATENT DOCUMENTS

WO  WO 2005/117326  12/2005

OTHER PUBLICATIONS

Chave, A. D. et al. (1991) *Electromagnetic Methods in Applied Geophysics* (ed. M.N. Nabighian), vol. 2, Chapter 12, pp. 931-966, Society of Exploration Geophysicists.

Constable, S. et al. (1996) "Marine Controlled-Source Electromagnetic Sounding 2. The PEGASUS Experiment," *J. Geophs. Res.*, vol. 101, pp. 5519-5530.

(Continued)

*Primary Examiner* — Bot Ledynh

(57) ABSTRACT

A method and apparatus of constructing a signal for a controlled source electromagnetic survey is described. In one embodiment, a method is described that includes determining a first waveform and a second waveform, the first waveform and second waveform related to a combined frequency spectrum and bandwidth associated with a geophysical survey line. Then, a signal is constructed by sequencing the first waveform with the second waveform. This signal may be utilized in a transmitter, which may be pulled by a vessel along the geophysical survey line.

39 Claims, 14 Drawing Sheets

OTHER PUBLICATIONS

Duncan, P. M. et al. (1980) "The Development and Applications of a Wide Band Electromagnetic Sounding System Using a Pseudo-Noise Source," *Geophysics*, 45, pp. 1276-1296.

Eidesmo, T. et al. (2002) "Sea Bed Logging (SBL), a New Method for Remote and Direct Identification of Hydrocarbon Filled Layers in Deepwater Areas," *First Break*, vol. 20.3, pp. 144-152.

Ellingsrud, S. et al. (2002) "Remote Sensing of Hydrocarbon Layers by Seabed Logging (SBL): Results from a Cruise Offshore Angola," *The Leading Edge*, pp. 972-982.

Helwig, S. L. et al. (1999) "The VIBR OTEM Method," SEG Annual Meeting Extended Abstracts, pp. 283-285.

MacGregor, L. M. (1997) *Electromagnetic investigation of the Reykjanes Ridge near 58° North*, Ph.D. Dissertation, Cambridge, pp. 84-86.

MacGregor, L. et al. (2001) "Electrical Resistivity Structure of the Valu Fa Ridge, Lau Basin, From Marine Controlled-Source Electromagnetic Sounding," *Geophy. J. Int.*, vol. 146, pp. 217-236.

Spies, B. R. (1989) "Depth of Investigation in Electromagnetic Sounding Methods," *Geophysics*, vol. 54.7, pp. 872-888.

West, G. F. et al. (1987) Physics of Electromagnetic Induction Exploration Method in *Electromagnetic Methods in Applied Geophysics* (ed. M. Nabighian), Society of Exploration Geophysicists vol. 2, pp. 5-45.

EP Search No. RS 113198 dated Apr. 10, 2006 (1 page).

\* cited by examiner

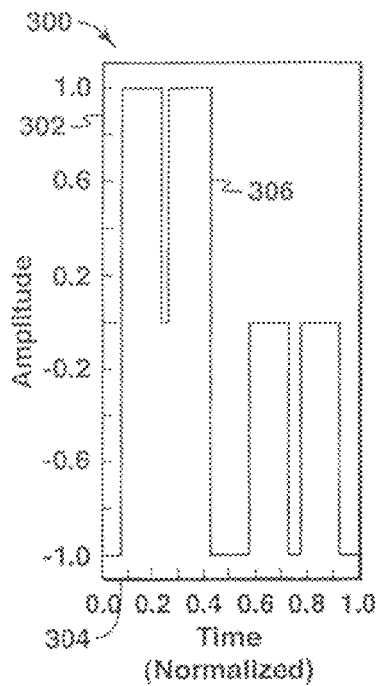
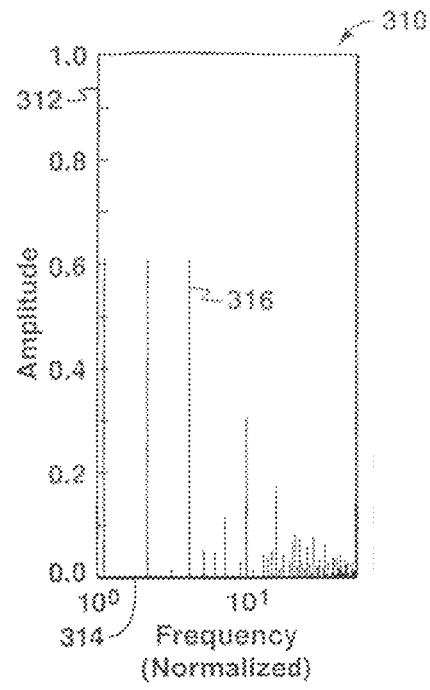
FIG. 3A          FIG. 3B
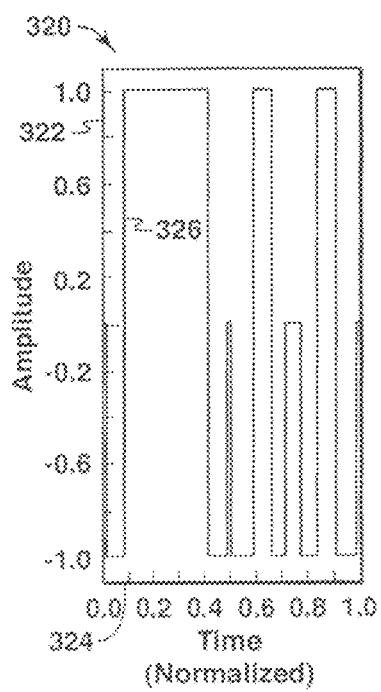
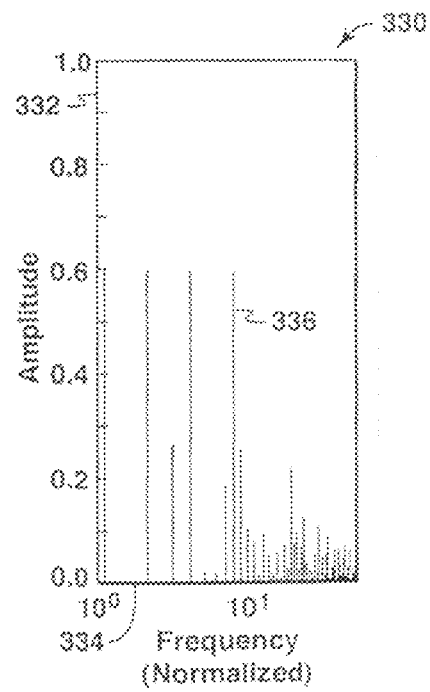
FIG. 3C          FIG. 3D

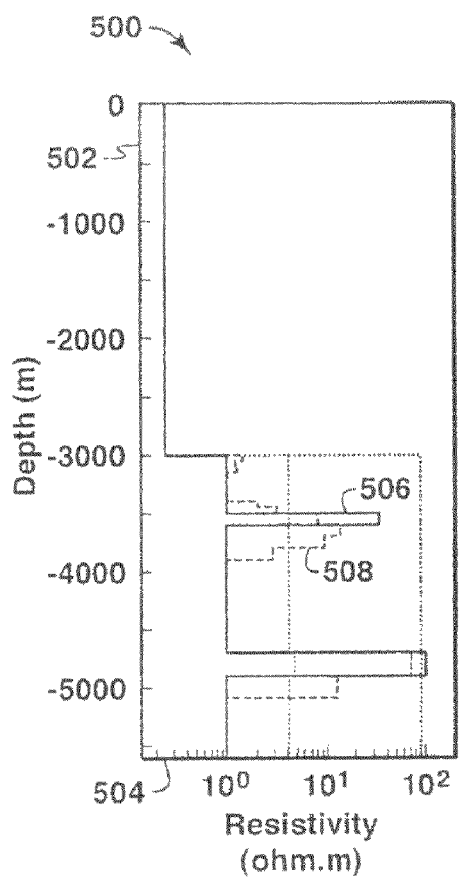 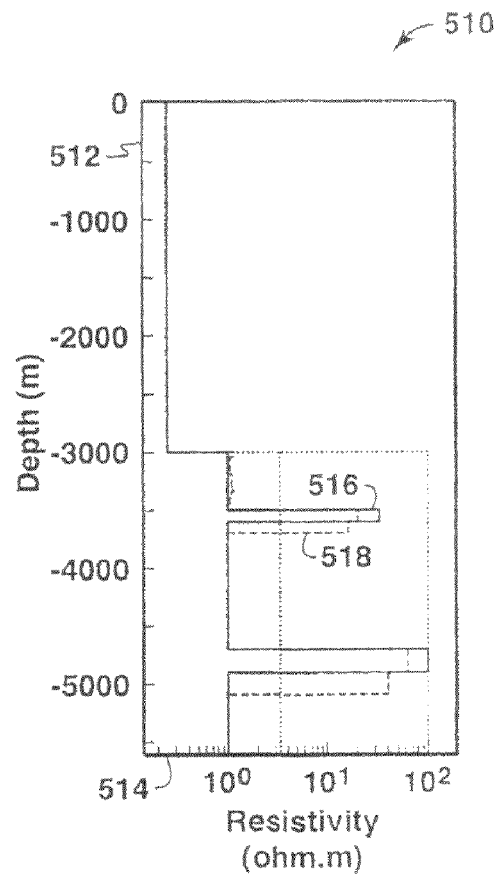
*FIG. 5A*    *FIG. 5B*

METHOD AND APPARATUS FOR UTILIZING TIME DIVISION MULTIPLE WAVEFORM TRANSMITTING

This application claims the benefit of U.S. Provisional Application No. 60/726,902 filed on Oct. 14, 2005.

FIELD OF THE INVENTION

This invention relates generally to the field of geophysical prospecting and, more particularly, to electromagnetic surveys. Specifically, the invention relates to the field of controlled-source electromagnetic surveys for geophysical applications, and transmitter waveforms for generating controlled-source electromagnetic fields.

BACKGROUND OF THE INVENTION

This section is intended to introduce the reader to various aspects of art, which may be associated with exemplary embodiments of the present techniques, which are described and/or claimed below. This discussion is believed to be helpful in providing the reader with information to facilitate a better understanding of particular aspects of the present techniques. Accordingly, it should be understood that these statements are to be read in this light, and not necessarily as admissions of prior art.

To obtain geophysical data about specific areas, a controlled-source electromagnetic (CSEM) geophysical survey system may utilize a transmitter and receivers. In this type of system, the transmitter may be flown above the earth's surface by an aircraft or towed by a vessel along a survey line. Typically, the transmitter is a man-made source that generates electromagnetic fields to excite the earth. The transmitted waveforms or signals are received by receivers on the earth surface, seafloor and/or inside boreholes to measure electric and magnetic fields of the specific area of the earth. The electromagnetic (EM) fields generated by the transmitter may be created by injecting the currents into the earth or seawater/seafloor or by oscillating the currents in closed-loop wire, in either case, using a chosen low-frequency periodic waveform. The shape of the transmitted waveform determines its frequency spectrum. That is, the transmitter controls the frequency content, frequency distribution and amplitude at each frequency for the transmitted waveform. These measured electric and magnetic fields are then analyzed to determine the electrical resistivity of the earth structures beneath the earth's surface or seafloor.

As can be appreciated, this technology has been applied for onshore mineral exploration, oceanic tectonic studies, and offshore petroleum and mineral resource exploration. For example, as noted above, the controlled-source electromagnetic (CSEM) geophysical survey may be performed on vehicles in land based system, in the vessels in water based systems and/or by aircraft by air based devices, which are further discussed in various documents. See A. D. Chave, S. Constable, and R. N. Edwards, in *Electromagnetic Methods in Applied Geophysics* (ed. M. N. Nabighian), Vol. 2, 931-966, Society of Exploration Geophysicists; S. Constable and C. S. Cox, *J. Geophs. Res.*, Vol. 101, 5519-5530, 1996; L. MacGregor, M. Sinha, and S. Constable, *Geophy. J. Int.*, Vol. 146, 217-236, 2001; S. Ellingsrud, T. Eidesmo, S. Johansen, M. C. Sinha, L. M. MacGregor, and S. Constable, *The Leading Edge*, 972-982, 2002; T. Eidesmo, S. Ellingsrud, L. M. MacGregor, S. Constable, M. C. Sinha, S. Johansen, F. N. Kong, and H. Westerdahl, *First Break*, Vol. 20.3, 144-152, 2002.

However, because of the cost of operating the aircraft or vessel, a pass over the survey line may be performed only once. That is, the data for a single survey line may be collected one time to reduce operating costs. This single pass approach using waveforms currently available does present some problems with the frequency bandwidth, the efficient transmission of energy at desired frequencies, and the energy distribution of the transmitted frequencies. For instance, available waveforms may not provide a frequency bandwidth wide enough to probe a desired range of depths. As such, noises may degrade data quality because the transmitted energy is limited and not strong enough to generate measurable responses at some frequencies.

Accordingly, the need exists for a method and apparatus to design and generate transmitter waveforms for controlled-source electromagnetic surveys for geophysical applications that compensates for the limitations in the transmitter power and with noise provided to the measurement system.

SUMMARY OF THE INVENTION

In one embodiment, a method of constructing a signal for a source along a geophysical survey line for a controlled source electromagnetic survey is described. The method includes determining a first waveform and a second waveform. The first waveform and second waveform are related to a combined frequency spectrum and bandwidth associated with a geophysical survey line. Then, a signal is constructed for a specific time interval along the geophysical survey line by sequencing the first waveform with the second waveform. The signal is repeated for another time interval along the geophysical survey line. The combined frequency spectrum and bandwidth are configured to explore a pre-selected range of target depths and the first and second waveform are sequenced along spatial sections of the geophysical survey line, which may be used with a moving source.

In a first alternative embodiment, a method for constructing a signal for a controlled source electromagnetic survey is described. The method includes determining a time interval for a compound waveform associated with a geophysical survey line. Then, a spectrum of frequencies for the compound waveform is determined. With the spectrum, the compound waveform having a plurality of base waveforms based on the time interval and the spectrum of frequencies is constructed. Then, the compound waveform is repeated for different time intervals along the geophysical survey line.

In a second alternative embodiment, a transmitter for constructing a compound waveform for a source along a geophysical survey line for a controlled source electromagnetic survey is described. The transmitter includes an antenna and waveform creation logic coupled to the antenna. The waveform creation logic is configured to provide a plurality of base waveforms, wherein the plurality of base waveforms are related to a combined frequency spectrum and bandwidth associated with a geophysical survey line; to construct a compound waveform having a specific time interval by sequencing the plurality of base waveforms; and repeat the compound waveform at another time interval along the geophysical survey line. The combined frequency spectrum and bandwidth being utilized to explore a pre-selected range of target depths associated with a geophysical survey line. The specific time interval for the compound waveform being associated with one of a plurality of spatial sections along the geophysical survey line.

In a third alternative embodiment, a system for conducting a controlled source electromagnetic survey with a compound waveform for a source along a geophysical survey line is described. The system includes a vessel coupled to a transmitter via a cable and at least one receiver configured to detect the compound waveform. The transmitter includes transmission circuitry and waveform creation logic coupled to the transmission circuitry. The waveform creation logic is configured to provide a plurality of base waveforms, wherein the plurality of base waveforms is related to a combined frequency spectrum and bandwidth associated with a geophysical survey line; to construct the compound waveform having a specific time interval by sequencing the plurality of base waveforms; and to repeat the compound waveform at another time interval along the geophysical survey line.

In a fourth alternative embodiment, a method of constructing a signal for a controlled source electromagnetic survey is described. The method includes determining a first waveform and a second waveform, the first waveform and second waveform related to a combined frequency spectrum and bandwidth associated with a geophysical survey line and constructing a signal by sequencing the first waveform with the second waveform, wherein the signal has durations and gaps set such that the compound waveform has the desired spectral content.

BRIEF DESCRIPTION OF THE DRAWINGS

The foregoing and other advantages of the present technique may become apparent upon reading the following detailed description and upon reference to the drawings in which:

FIGS. 3A-3F are exemplary charts of some base waveforms utilized in the CSEM geophysical surveying system of FIG. 1 in accordance with the present techniques;

FIGS. 5A and 5B are exemplary earth resistivity profiles generated from data acquired from the CSEM geophysical surveying system of FIG. 1 in accordance with the present techniques;

DETAILED DESCRIPTION OF THE PREFERRED EMBODIMENTS

In the following detailed description, the specific embodiments of the present invention will be described in connection with its preferred embodiments. However, to the extent that the following description is specific to a particular embodiment or a particular use of the present techniques, this is intended to be illustrative only and merely provides a concise description of the exemplary embodiments. Accordingly, the invention is not limited to the specific embodiments described below, but rather, the invention includes all alternatives, modifications, and equivalents falling within the true scope of the appended claims.

The present technique is directed to a method and system that optimize transmitter waveforms. Under the present techniques, which may be referred to herein as Time Division Multiple Waveform Transmitting (TDMWT), a transmitter transmits a compound waveform composed of different base waveforms at designated time intervals rather than one base waveform. The repeated series of combined base waveforms, such as a first waveform and a second waveform, are referred to as a compound waveform. The individual base waveforms in the compound waveform may be repeated and adjusted to comply with survey objectives. That is, the transmitter of the present technique allocates power to specific frequencies to enhance the quality of the data received for different locations along a survey line. As such, the transmitter utilizing the present techniques may enhance the geophysical survey.

Figure 1:
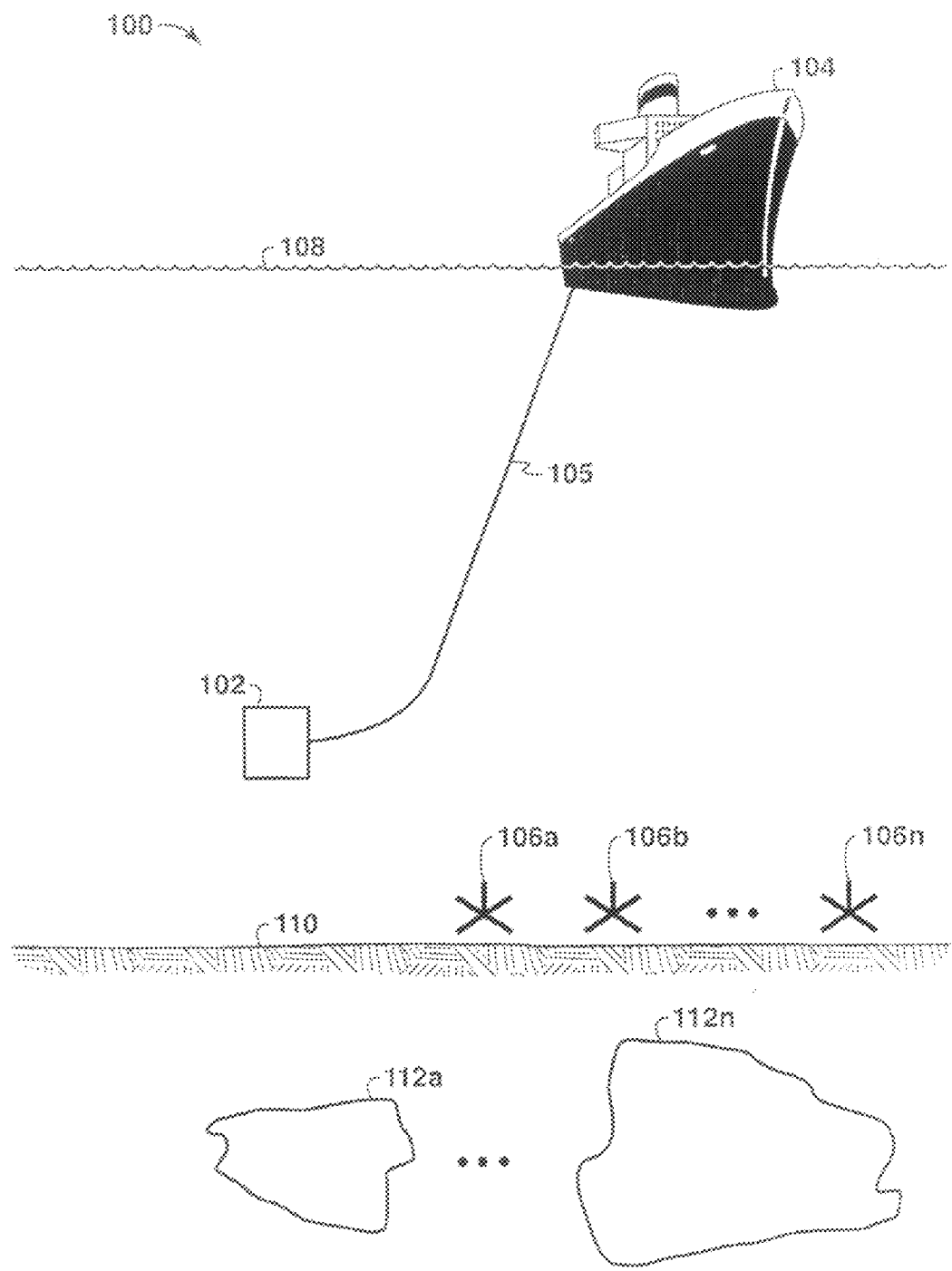
FIG. 1 is an exemplary diagram of an offshore controlled source electromagnetic geophysical surveying system in accordance with the present techniques.

Turning now to the drawings, and referring initially to FIG. 1, an exemplary geophysical survey system is illustrated. The geophysical survey system 100 includes a transmitter 102 and various receivers 106a-106n positioned in various patterns. The transmitter 102 is moved along a set path by a vessel, such as a survey ship 104, to generate EM fields of preset waveforms to receivers 106a-106n. The number of receivers 106a-106n may be varied depending on the area to be surveyed or other similar limitations. Then, the receivers 106a-106n are collected and the recorded data is analyzed to infer the associated geophysical aspects of the target area.

The geophysical survey system 100, which includes the transmitter 102 and receivers 106a-106n, provides data about geophysical properties of the subsurface regions 112a-112n. Accordingly, the transmitter 102 may include various components, which are discussed in FIG. 2, that are utilized to transmit signals having specific waveforms to conduct a controlled-source electromagnetic (CSEM) geophysical survey. The transmitter 102 may be towed by the vessel 104, which operates at the surface 108 of a body of water, via a cable 105. The cable 105 may be utilized by the survey ship 104 to provide power and communicate with the transmitter 102. That is, the transmitter 102 may utilize the power from the survey ship 104 to transmit waveforms to various receivers 106a-106n.

The receivers 106a-106n may be distributed along the sea floor 110 in a specific pattern, such as a survey line, which may be along a straight line, mesh pattern, or even within a wellbore. Also, it should be noted that the receivers may be distributed inside a wellbore or in other locations. The receivers 106a-106n may be devices that collect the electromagnetic responses of the earth to the waveforms transmitted by the transmitter 102 along with other signals for a specific period of time. That is, the receivers 106a-106n may be utilized to collect any signals or waveforms for a specified period of time. This information or data is then correlated to the transmitter 102 location to provide geophysical data about subsurface area, such as a subterranean region 112a-112n. With this correlated data, a well (not shown) may be drilled and completed to produce the hydrocarbons from the subterranean region 112a-112n.

Accordingly, because the survey ship 104 may tow the transmitter 102 in various patterns, which may be based on the locations of the receivers 106a-106n or geophysical areas of interest, the electric and magnetic fields for the specific areas are obtained. The electric and magnetic fields measured by receivers 106a-106n are then analyzed to determine the electrical resistivity of the earth structures beneath the surface or seafloor. This technology has been applied for onshore mineral exploration, oceanic tectonic studies, and offshore petroleum and mineral resource exploration as discussed in *Electromagnetic Methods in Applied Geophysics, Geophy. J. Int* and *First Break*, which are hereby incorporated by reference. See A. D. Chave, S. Constable, and R. N. Edwards, in *Electromagnetic Methods in Applied Geophysics* (ed. M. N. Nabighian), Vol. 2, 931-966, Society of Exploration Geophysicists; L. MacGregor, M. Sinha, and S. Constable, *Geophy. J. Int*. 146, 217-236 (2001); T. Eidesmo, S. Ellingsrud, L. M. MacGregor, S. Constable, M. C. Sinha, S. Johansen, F. N. Kong, and H. Westerdahl, *First Break* 20.3, 144-152 (2002).

The transmitter 102 generates the electromagnetic fields by transmitting time-varying electric current or waveform of a certain shape. The shape of this waveform determines its frequency spectrum. That is, the transmitter controls the frequency content, phase and amplitude at each frequency. Generally, a single pass over a specific portion of the seafloor 110 is utilized because of the cost associated with operating the survey ship 104. However, it is difficult to acquire reliable data with a range of exploration depths by a single pass using waveforms currently available. As such, the transmitter 102 may include various components to create and manage the generation of waveforms, which are further discussed in FIG. 2.

Figure 2:
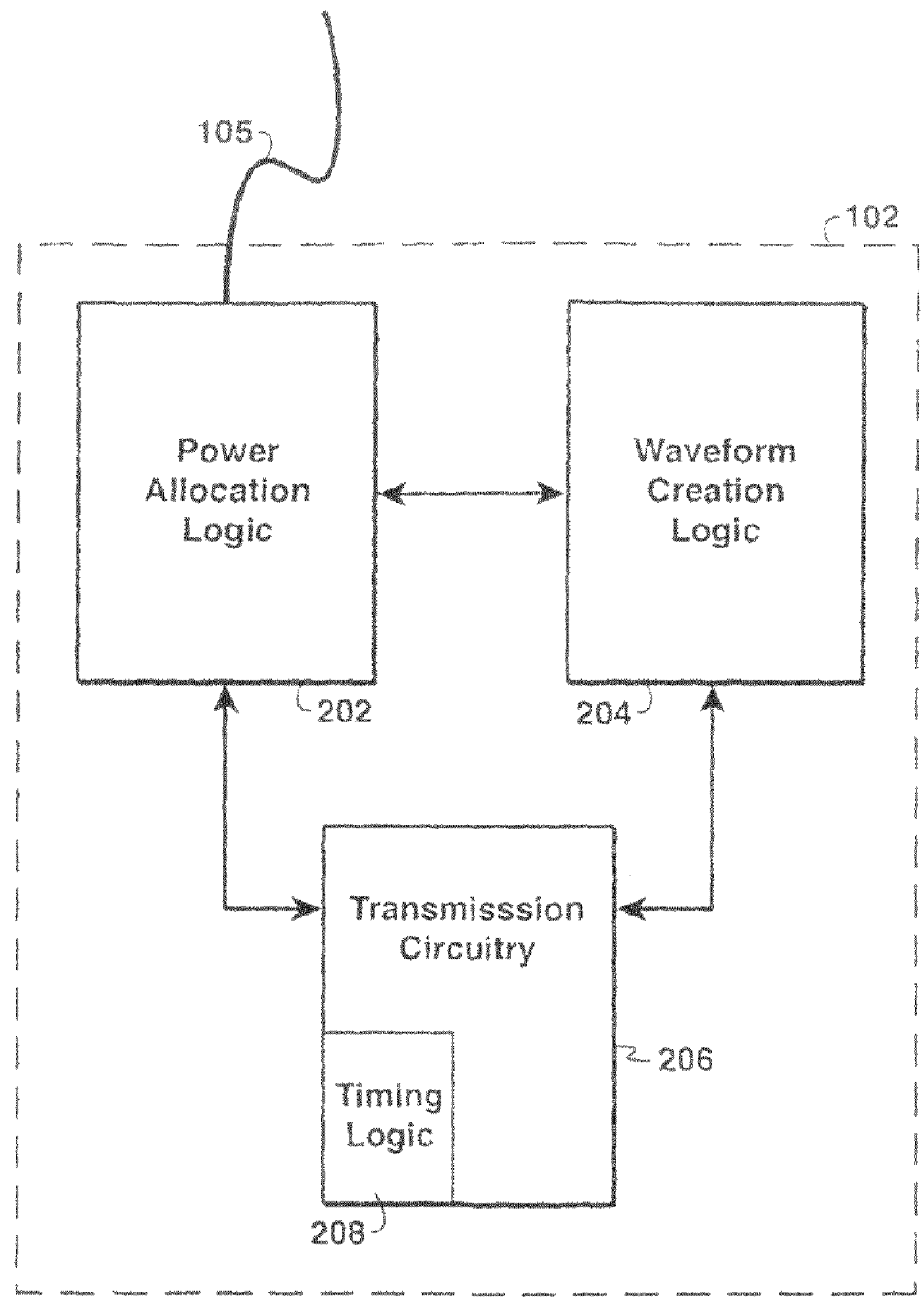
FIG. 2 is an exemplary block diagram of a transmitter utilized in the CSEM geophysical surveying system of FIG. 1 in accordance with the present techniques.

FIG. 2 is an exemplary block diagram of a transmitter utilized in the CSEM geophysical surveying system 100 of FIG. 1. In FIG. 2, the transmitter 102 may include various components that interact with the survey ship 104 via the cable 105 to allocate power and generate various waveforms. For instance, the transmitter 102 may include power allocation logic 202, waveform creation logic 204 and transmission circuitry 206. Each of these components is utilized to generate the waveforms transmitted to the receivers 106a-106n. It should be noted that this transmitter 102 is merely for exemplary purposes, as these components may be located within other devices, such as the survey ship 104, or combined together in other embodiments, which is discussed further below.

The power allocation logic 202 may be utilized to allocate power to the waveform creation logic 204 and transmission circuitry 206 within the transmitter 102. The power allocation logic 202 may include software components, hardware components, and/or a combination thereof. The power allocation logic 202 may receive power from the survey ship 104 via the cable 105 or may be coupled to a power source, such as a battery, located within the transmitter 102. With the power, the power allocation logic 202 distributes the power to other components for operation of the transmitter 102. As the power provided to the transmitter 102 may be relatively fixed or limited, the allocation of power may be a limiting factor on the strength of the waveforms generated from the transmitter 102.

The waveform creation logic 204 may be utilized to generate various base waveforms. Similar to the power allocation logic 202, the waveform creation logic 204 may include software components, hardware components, and/or a combination thereof. The selection of the waveforms and duration of the waveforms may influence the specific configuration of the waveform creation logic 204, which is discussed further below. Regardless, to generate the specific waveforms, the waveform creation logic 204 receives power from the power allocation logic 202 and utilizes this power to generate the waveforms provided to the transmission circuitry 206. The selection of base waveforms in the compound waveform may be stored in the memory of the waveform creation logic 204 prior to the use of the transmitter 102. That is, the specific compound waveforms to be transmitted or parameters for generating the compound waveforms by the transmitter 102 may be determined and stored within the transmitter 102 for use over a geophysical survey line. The amount of power and manner that the power is distributed to the waveform creation logic 204 may be based on communication between the waveform creation logic 204 and the power allocation logic 202.

The transmission circuitry 206 may be utilized to transmit the waveforms created by the waveform creation logic 204. The transmission circuitry 206 may include an antenna, such as a loop antenna or dipole antenna, for example, along with other software components and hardware components. These components may be utilized to manage and coordinate the transmission of the compound waveforms via the antenna to the receivers 106a-106n. Further, the transmission circuitry 206 may also include timing logic 208 that provides a time standard for the transmitter 102. The timing logic 208 may be utilized to communicate with the waveform creation logic 204 to determine or adjust the base and compound waveforms. Accordingly, to comply with survey objectives and to enhance the geophysical survey, various aspects of the waveforms, such as waveform shape and amplitude, received data clarity, and/or data ambiguity problems, may be considered, as discussed below.

A variety of waveforms are available for use. For instance, the simplest one is a sinusoidal wave that contains only one frequency. Also, the square wave is another widely-used waveform, which includes the symmetric square wave that has the same time duration for positive and negative polarities. See L. M. MacGregor, *Electromagnetic investigation of the Reykjanes Ridge near 58° North*, Ph.D. Dissertation, Cambridge, 84-86 (1997). The symmetric square waive has a fundamental and only odd harmonics in its spectrum and the amplitudes decrease quickly with increasing harmonics. Because multiple frequencies offer an advantage in terms of spatial resolution of data, the limited flexibility of the sinusoidal and square waveforms to transmit high power at several frequencies during a single pass of the survey ship 104 restricts the collection of high quality data for these waveforms.

Accordingly, some special waveforms have been designed and created. For instance, a Cox waveform has the same and relatively large amplitude for the first and third harmonics. See S. Constable and C. S. Cox, J. Geophs. Res., Vol. 101, 5519-5530, 1996). Unfortunately, the frequency band covered by these two harmonics of the Cox waveform is narrow and the amplitudes for higher harmonics decrease rapidly as the frequency increases. Another special waveform is the pseudo-random binary sequence (PRBS) waveform. The PRBS waveform, which includes frequencies that are linearly spaced, may provide more useful frequencies that span wider frequency bands and hence provide improved resolution. See P. M. Duncan et al., Geophysics, 45, 1276-1296 (1980); S. L.

Helwig, et al., SEG Annual Meeting Extended Abstracts, 283-285 (1999). Thus, both the Cox and PRBS waveforms offered limited flexibility in designing the spectrum of the waveform.

A waveform with a spectrum of frequencies spaced logarithmically may provide data with better depth resolution about the subsurface regions. Accordingly, logarithmically-spaced multipeak waveforms, such as tripeak, quadpeak, and pentapeak waveforms described in PCT International Publication No. WO2005/117326 which is hereby incorporated by reference, may be utilized to enhance the quality of the data received by the receivers. For example, the multipeak waveforms may be utilized with power allocated to certain frequencies and harmonics, such as the fundamental frequency and the first three harmonics. However, as power is distributed evenly on more and more harmonics, not only do the waveforms become more and more complicated (i.e. more polarity switches and less uniform duration), but also the amplitudes decrease quickly, as the number of the equalized amplitudes increases. As such, the useful bandwidth of these waveforms is limited by the transmitter power. These multipeak waveforms are shown in greater detail in FIG. 3A-3F.

Figure 3E:
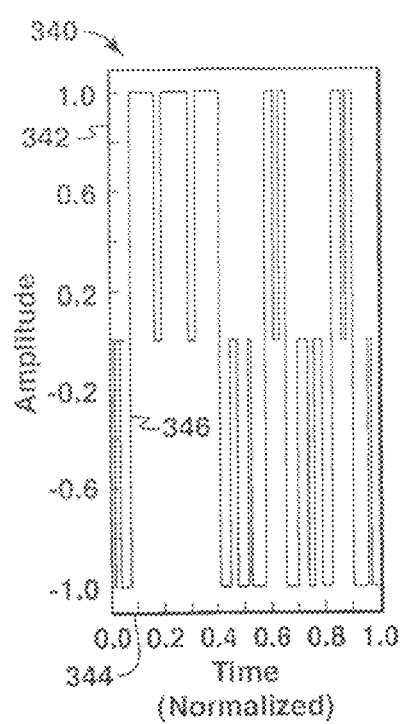

FIGS. 3A-3F are exemplary charts of waveforms utilized in the CSEM geophysical surveying system of FIG. 1 in accordance with the present techniques. In FIGS. 3A and 3B, which may be referred to by reference numerals 300 and 310, respectively, a tripeak waveform that may be generated by the transmitter 102 is shown. In FIG. 3A, the chart 300 compares the current amplitude 302 of a tripeak waveform 306 versus time 304. In FIG. 3B, the chart 310 compares the amplitude 312 of the tripeak waveform 306, which is represented by the tripeak frequency waveform 316, versus frequency 314. As shown by these charts 300 and 310, the tripeak waveform generates approximately equal amplitudes at the first, second, and fourth harmonics of its period.

Similarly, in FIGS. 3C and 3D, which may be referred to by reference numerals 320 and 330, respectively, a quadpeak waveform that may be generated by the transmitter 102 is shown. In FIG. 3C, the chart 320 compares the amplitude 322 of a quadpeak waveform 326 versus time 324. In FIG. 3D, the chart 330 compares the amplitude 332 of the quadpeak waveform 326, which is represented by the quadpeak frequency waveform 336, versus frequency 334. As shown by these charts 320 and 330, the quadpeak waveform generates approximately equal amplitudes at four harmonics. In addition, its total energy is somewhat higher than the tripeak waveform because the current spends less time at zero.

Figure 3F:
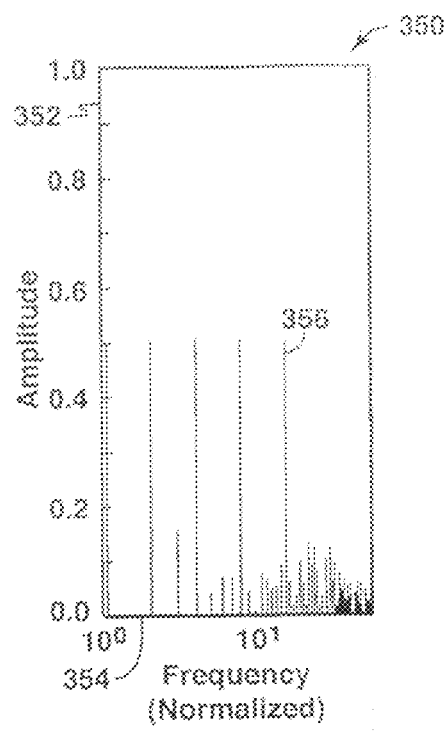

Finally, in FIGS. 3E and 3F, which may be referred to by reference numerals 340 and 350, respectively, a pentapeak waveform that may be generated by the transmitter 102 is shown. In FIG. 3E, the chart 340 compares the amplitude 342 of a pentapeak waveform 346 versus time 344. In FIG. 3F, the chart 350 compares the amplitude 352 of the pentapeak waveform 346, which is represented by the pentapeak frequency waveform 356, versus frequency 354. As shown by these charts, 340 and 350, the pentapeak waveform creates more harmonics of approximately equal amplitude, but at the expense of putting less energy in each harmonic.

Figure 4:
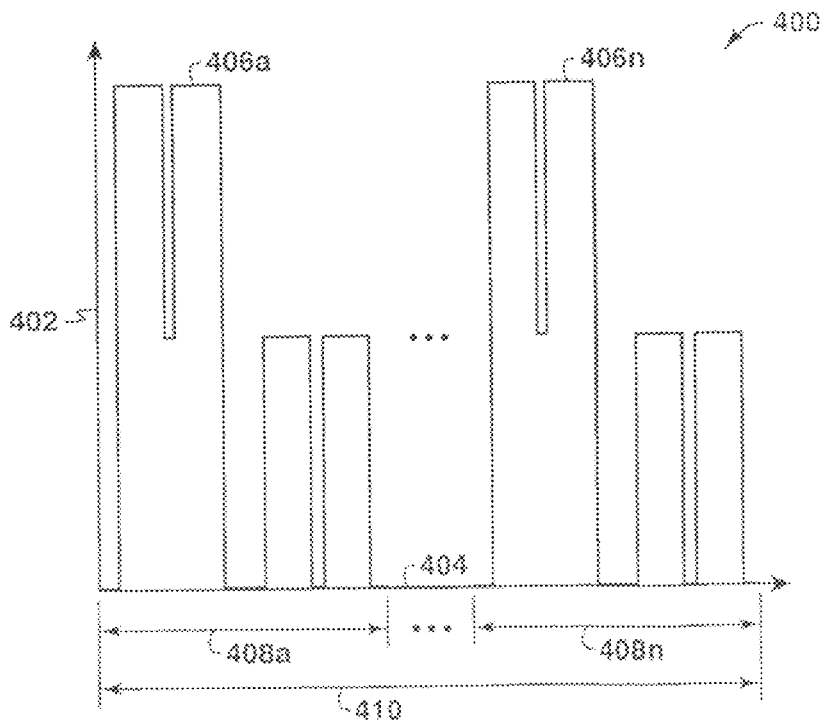
FIG. 4 is an exemplary chart of waveform transmitting scheme in the CSEM geophysical surveying system of FIG. 1.

In addition to the variations in the waveform shapes and amplitudes, the waveforms of the geophysical survey system 100 of FIG. 1 may also be repeated over certain intervals or periods of time to further enhance the data quality. As noted above, typical geophysical survey systems utilize a base waveform for the pass over the survey line to generate a spectral bandwidth from the fundamental frequency to an infinite frequency by repeating the single base waveform. For example, as shown in FIG. 4, an exemplary waveform transmitting scheme utilized in the CSEM geophysical surveying system of FIG. 1 may be repeated within specific intervals of time to enhance the quality of the data obtained at the receivers. In FIG. 4, an exemplary chart, which is generally referred to as reference numeral 400, compares the amplitude 402 of a waveform versus the time 404. In this example, one tripeak base waveform is repeated over the duration of a total time interval T. This total time interval, which is discussed further below, may be associated with a linear distance of the pass over the survey line. The first waveform 406a is generated for a first time interval 408a, while the last waveform 406n is generated over a last time interval 408n. The number of base waveforms 406a-406n and base time intervals 408a-408n depends upon the interval of time 410 for the survey line to be completed. Accordingly, the tripeak base waveforms 406a-406n may be continuously or intermittedly repeated over the time interval 410. However, useful data acquired may be limited for these bandwidths because of interference from noise. The noise may include magnetotelluric (MT) signals, motion by ocean waves, electronic noises, etc. In addition, higher skin-depth losses at high frequencies and transmitter power limitation may further limit the system. Accordingly, because such an operation of repeatedly transmitting a base waveform has difficulties satisfying the different survey objectives, different base waveforms may be repeated to enhance the data received.

Also, the repeated waveforms may be utilized for target-oriented geophysical surveys. The target-oriented geophysical surveys repeat certain waveforms to target subterranean regions that are well defined and characterized by seismic, logs, and other measurements, such as MT, and even a previous CSEM survey. As such, the data may be enhanced by utilizing fewer frequencies for sampling the targeted subterranean regions that are repeated to comply with the survey objective. For instance, if the overburden above the target is well defined by other measurements, such as MT and even previous CSEM surveys, it may be beneficial to use fewer frequencies for sampling the overburden, which allows more frequencies to be utilized to focus on the target. As this targeting of specific subterranean regions may vary over a survey line, the use of a single base waveform with a specific frequency, as in conventional approaches, is unable to adjust the waveforms for different subterranean regions on a survey line. As a result, a mechanism that designs a waveform for an optimal target-oriented survey may be beneficial. Alternatively, for CSEM reconnaissance surveys, it may be beneficial for a source to transmit EM fields at more frequencies on a wide frequency band with the frequencies distributed evenly and energy transmitted uniformly. This may provide data that addresses the limited information about the survey areas and the non-uniqueness associated with the inversion problem.

Further, the waveforms from the waveform creation logic 204 may also be utilized to mitigate data ambiguity problems with the subterranean regions. As noted above, the effective exploration depth for low-frequency EM fields increases with decreasing frequency and conductivity of the medium, according to the skin effect phenomena. Also, as noted in *Electromagnetic Theory* and *Geophysics*, EM signals sense targets at a limited range of approximately 1-2 skin depths because of the skin depth effect. See J. A. Stratton, *Electromagnetic Theory*, MacGraw-Hill, 1941; B. R. Spies, *Geophysics*, 54, 872-888 (1989). Due to the diffusive nature of the EM field, the resolution of a CSEM geophysical survey is low and a highly simplified (i.e. blurred) picture of 3D structures is obtained by inversion. See G. F. West and J. C. Macnae, *Physics of Electromagnetic Induction Exploration Method* in *Electromagnetic Methods in Applied Geophysics* (ed. M. N.

Nabighian), vol. 2, 5-45, Society of Exploration Geophysicists (1987). Accordingly, if the subterranean region is inadequately sampled by the CSEM geophysical survey, inverted results may be non-unique, which presents problems with data interpretation. However, the non-uniqueness of the data may be reduced by having more data from wider frequency bands. As such, the width of the frequency band is useful to mitigate ambiguity associated with inversion. The problem with inversion is further described in FIGS. 5A and 5B.

FIGS. 5A and 5B are exemplary earth resistivity profiles generated from data acquired from the CSEM geophysical surveying system of FIG. 1 in accordance with the present techniques. In FIGS. 5A and 5B, which may be referred to by reference numerals 500 and 510, respectively, a synthetic example is shown which is based on a one-dimensional model with a 100 meter (m) resistive layer of 30 ohm-m and 1.1 kilo-m (km) above another resistive layer that is 200 m thick and has resistivity of 100 ohm-m. In FIG. 5A, the depth 502 of a true model 506 and an inverted model 508 are shown against the resistivity 504. In this comparison, three frequencies of 0.5 Hz, 0.25 Hz and 0.125 Hz are utilized to generate the model 508. In FIG. 5B, the depth 512 of a true model 516 and an inverted model 518 are shown again against the resistivity 514. In this comparison, six frequencies of 2.0 Hz, 1.0 Hz, 0.5 Hz, 0.25 Hz, 0.125 Hz and 0.0625 Hz were utilized to generate the model 518. In comparing the models 508 and 518, it is clear that the use of six frequencies provides a much less ambiguous perspective of the resistivity. As such, the waveform creation logic 204 may be configured to transmit waveforms or EM fields at more frequencies on a wide frequency band with frequency distributed evenly and energy transmitted to compensate for the problems with data inversion.

Accordingly, to acquire data efficiently and satisfy survey objectives, the transmitter 102 or waveform creation logic 204 may generate waveforms over multiple frequencies in a wide frequency band with the large amplitudes. Further, because the transmitter 102 is often towed only once over the survey line, the waveforms provided by the waveform creation logic 204 may have to balance the number of frequencies and bandwidth because of limited resources, such as power. As a result, the transmitter 102 may be configured to generate waveforms with features that reduce possible interference and ambiguity while enhancing data quality. These features may include distributing multiple frequencies in an optimal manner, such as penetration depth or other features; efficiently and evenly distributing transmission energy across the desired frequencies; utilizing frequency bandwidths large enough to probe the depth range of interest; and designing the implementation to be easily modified or installed. As such, waveforms may be selected at specific frequencies under the present techniques, which may be referred to as Time Division Multiple Waveform Transmitting (TDMWT), to optimize the power allocation to the waveforms and to enhance the quality of the data received.

Accordingly, the geophysical survey system 100 of FIG. 1 may utilize TDMWT to optimize the waveforms provided from the transmitter 102. Under the TDMWT technique, the transmitter 102 may generate different base waveforms at designated time intervals rather than one base waveform over the entire survey time interval. The repeated series of combined base waveforms may be referred to as a compound waveform, as noted above. These compound waveforms may be utilized to enhance the operation of the geophysical survey and overcome problems, such as interference from noise, non-uniqueness of survey areas, and different target areas, for example.

Figure 6:
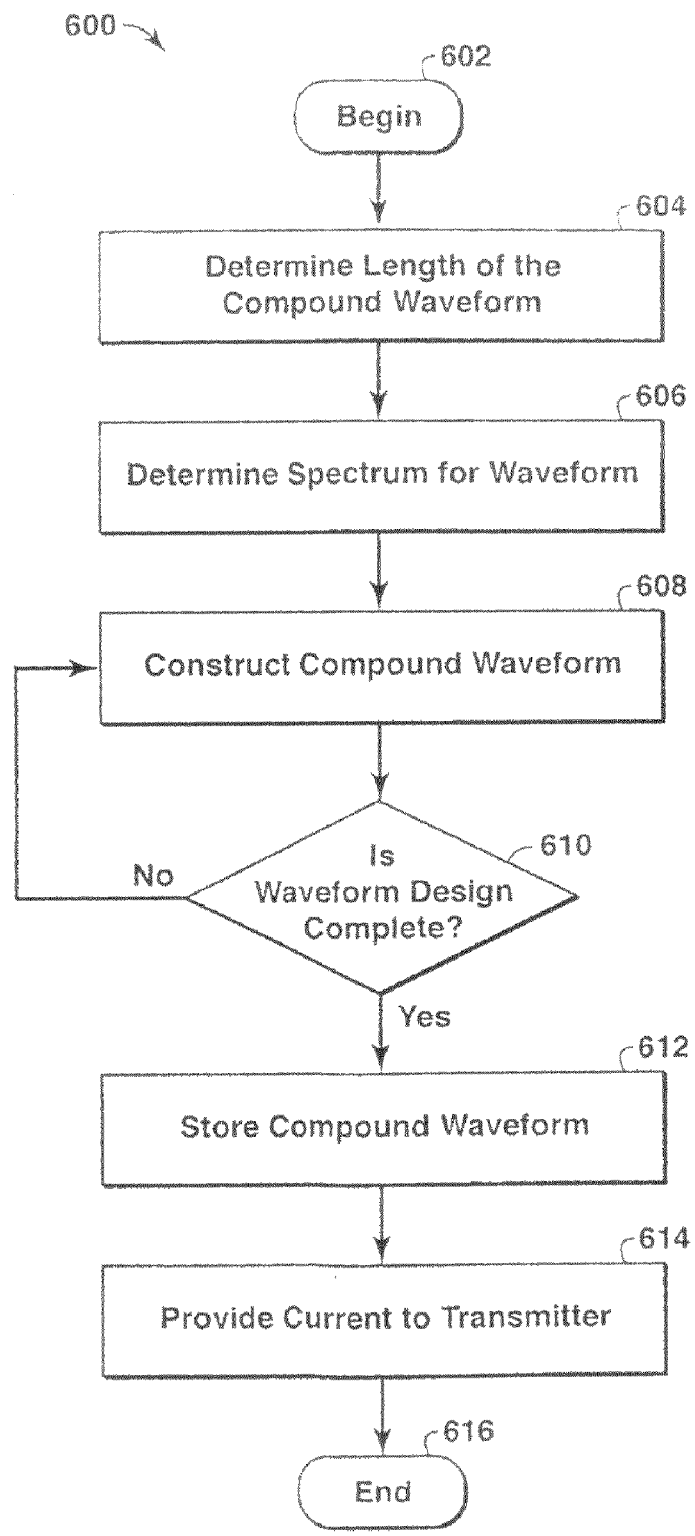
FIG. 6 is an exemplary flow chart of the construction of a compound waveform for use in the geophysical survey system of FIG. 1 in accordance with aspects of the present techniques.

FIG. 6 is an exemplary flow chart of the construction of a compound waveform for use in the geophysical survey system of FIG. 1 in accordance with aspects of the present techniques. This flow chart, which is referred to by reference numeral 600, may be best understood by concurrently viewing FIGS. 1 and 2. In this flow chart 600, various features and parameters are utilized to provide a compound waveform that is directed to specific survey objectives. It should be noted that these features are merely exemplary as other features may also be considered in the construction of the base and compound waveform. Further, it should also be noted that blocks 604 and 606 may be performed in any order or may be performed simultaneously in other embodiments.

The flow chart begins at block 602. At block 604, the length of the compound waveform may be determined based on the required spatial resolution. That is, the length of the compound waveform is the compound waveform time interval $T_{max}$ associated with the distance the transmitter moves relative to the spatial sampling interval. For a moving vessel, such as the survey ship 104, this compound waveform time interval. $T_{max}$ may be expressed in the equation below:

$$T_{max} = 1/(S_r * v)$$

where $S_r$ is the spatial sampling rate (1/m) of the receiver data and v is the towing speed (m/s) of the transmitter 102. Alternatively, for the case of a stationary transmitter, the compound waveform time interval $T_{max}$ may be selected as the time interval before the transmitter and/or receiver are to be moved to another location.

In block 606, a spectrum of frequencies (i.e. a set of required frequencies and related amplitudes) is selected. The spectrum may be a set of frequencies that are selected based on rules of thumb, experience with EM surveys in a particular environment, forward modeling studies, and/or other similar techniques. For example, a low frequency $f_{low}$ in the set of frequencies may be selected for penetration to a specific target depth, while higher frequencies in the set of frequencies may be selected to target shallow layers above the targeted subterranean region. As noted above, the higher frequencies may be utilized to resolve ambiguities in the inversion for earth resistivity. Also, within the selected range of frequencies, linear or log spacing (or some other arbitrary spacing) may also be selected based on the expected benefits.

Furthermore, as part of the spectrum selection, the number of selected frequencies may be adjusted because of signal-to-noise ratio (SNR) considerations. Accordingly, the amplitude of the waveforms at each selected frequency may be configured to overcome ambient noise levels, as noted above. For instance, the amplitudes of the selected frequencies may be relatively equal, larger for higher frequencies to compensate for skin-depth losses, varied to compensate for expected frequency-dependent ambient noise levels or determined from numerical simulation to the inversion results. Regardless, because the power provided to the transmitter 102 and the compound waveform time interval $T_{max}$ is limited, a tradeoff between the SNR, exploration depth objectives, and sampling density in depth is performed as part of this process.

Then, a specific compound waveform is created having base waveforms that satisfies the design objectives, as shown in block 608. The creation of the compound waveform may be performed in the waveform creation logic 204, as discussed above. As an example, two or more base waveforms may be selected from a waveform family or waveform families (e.g., square waveforms). The spacing of the frequencies may be utilized to determine the waveform family. For instance, if the set of frequencies may be approximated by a fundamental and odd harmonics, then a set of square-wave waveforms may be utilized. Similarly, if the frequencies are spaced as powers of two (log spacing), then a set of tripeak waveforms may be utilized. The relative amplitudes of the set of frequencies may be controlled directly by the amplitudes of the selected base waveforms or by controlling the duration of each of the selected base waveforms. That is, more time for a given base waveform (i.e. a larger fraction of the compound waveform time interval $T_{max}$) may allocate more energy to the spectral contents. Also, the base waveforms may be repeated on different frequencies. Accordingly, the compound waveform may have durations and gaps set such that the compound waveform has the desired spectral content.

Following the creation of the compound waveform, a determination is made whether the waveform design is complete, as shown in block 610. If the waveform design is not complete, then the spectrum of frequencies and construction of a compound waveform in blocks 606 and 608 may be performed again by varying certain aspects of the compound waveform. However, if the waveform design is complete, the base waveforms of the compound waveform may be stored into memory, as shown in block 612. The memory may be the memory located within a computer system, a processor based system and/or waveform creation logic 204 of the transmitter 102. At block 614, current may be provided to the transmitter 102 based on the compound waveform. By providing current to the transmitter 102, the compound waveform may be generated. The generation of the waveform typically involves determining its spectral components from its time series, but may include providing the waveform to the transmission circuitry 206 of the transmitter 102. The process ends at block 616.

Figure 7:
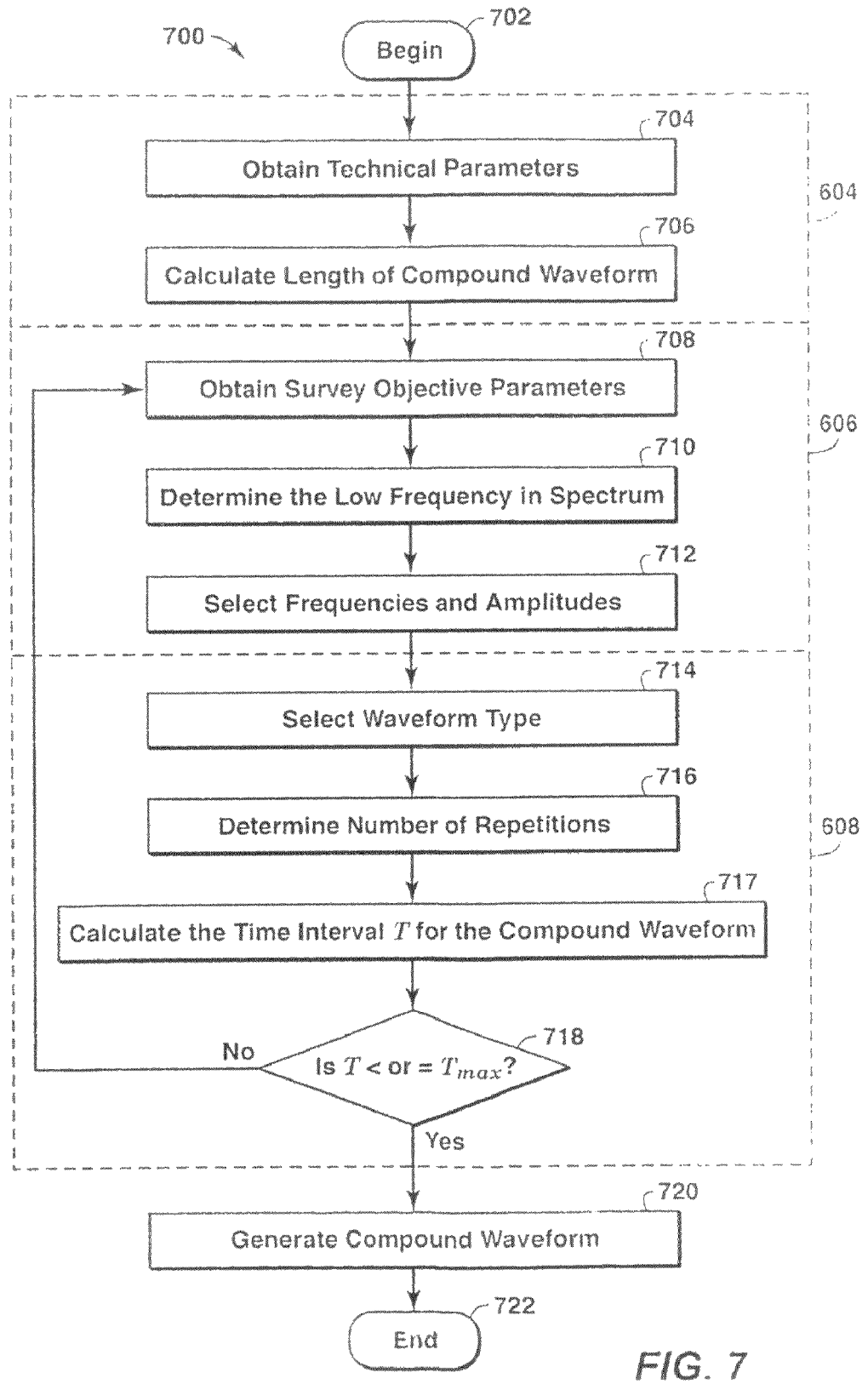
FIG. 7 is an exemplary flow chart of the operation of the process of FIG. 6 in accordance with aspects of the present techniques.

FIG. 7 is an exemplary flow chart of the operation of the process of FIG. 6 with the geophysical surveying system of FIG. 1 in accordance with aspects of the present techniques. In this flow chart, a geophysical survey system 100 may include waveform creation logic 204 that has certain parameters stored in memory within the transmitter 102 to generate the compound waveforms. The parameters may include predefined values, such as compound waveform time interval $T_{max}$, the low frequency $f_{low}$ in the set of frequencies, the repetition setting or number of repetitions $N_s$, and the type of waveforms, which may be sinusoidal or tripeak waveforms, for example. Alternatively, the compound waveforms themselves may be stored in memory, as well. Accordingly, because this flow chart is one exemplary embodiment of the process of FIG. 6, it may be best understood by concurrently viewing FIG. 6.

The flow chart begins at block 702. The length of the waveform, which is discussed above in block 604, may be determined in blocks 704 and 706. At block 704, the technical parameters may be obtained. These technical parameters may include the towing speed v of the survey ship 104 and/or spatial sampling rate $S_r$. The technical parameters may be obtained from a user entering the values into a computer or from the memory of the transmitter 102, which may include predefined settings programmed into the waveform creation logic 204, the survey ship 104 via the cable 105, velocity logic in the waveform creation logic 204 that estimates the velocity of the survey ship 104, and/or a feedback signal from within the transmitter 102. These predefined settings, which may be the base waveforms or parameters utilized to create the base waveforms, may be stored in memory before the transmitter 102 is deployed to perform the geophysical survey. Based on the technical parameters, the length of the compound waveform may be calculated, as shown in block 706. As noted before, the length of the compound waveform is the compound waveform time interval $T_{max}$, which may be represented by the equation below:

$$T_{max} = 1/(S_r * v)$$

In this equation, the towing speed v may be represented in meters/second (m/s), while the spatial sampling rate $S_r$ may be represented in 1/meters (1/m). Accordingly, based on this equation, the compound waveform time interval $T_{max}$ may be calculated for the geophysical survey.

Then, the spectrum of frequencies, which is discussed above in block 606, may be determined in blocks 708-712. At block 708, the survey objective parameters may be obtained. The survey objective parameters may include an investigation or target depth D of the subterranean regions to be examined along with resistivity of overburden ρ. These survey objective parameters may be stored within the waveform creation logic 204 in advance of the deployment or may be transmitted to the waveform creation logic 204 via the cable 105. With the survey objective parameters, a low frequency $f_{low}$ may be determined based on the skin depth effect, as shown in block 710. For instance, if the target depth D for a specific frequency is assumed to be about one skin depth, then the low frequency for a target at the target depth D may be estimated by the equation below:

$$f_{low} = \frac{\rho}{\pi \mu_0 D^2} \approx \left(\frac{503}{D}\right)^2 \rho \text{ in Hz}$$

where ρ is the resistivity of the overburden in Ohm-meters and $\mu_0$ is the permeability of free space. At block 712, frequencies and amplitudes may be selected. As noted above, frequencies and amplitudes may be determined in several manners. For instance, the frequencies may be selected to have log frequency spacing, which may be used to image at varying depths. Also, similar to the discussion above, the amplitudes may also be selected based on a numerical simulation that maximizes the expected accuracy of the result after inversion, as long as sufficient data is present.

With the frequencies and amplitudes determined, the compound waveform may be created (i.e. in a computer). The creation of the compound waveform, which is discussed above in block 608, may be performed in blocks 714-718. At block 714, the type of base waveform may be selected. The base waveforms may be selected to generate a combined spectrum, which is the same as or similar to the spectrum identified in blocks 710 and 712. However, various aspects may be considered between power and efficiency in selecting the base waveforms, which may include sinusoidal, square, Cox, PRBS, tripeak, quadpeak, pentapeak, or combination thereof. For instance, sinusoidal waveforms may generate a desired spectrum, but are not efficient because the transmitter 102 operates at peak power for each frequency for only a small fraction of the time. At block 716, the repetition setting or number of repetitions is determined, which may be based on the compound waveform time interval $T_{max}$. As noted above, the number of repetitions is the number of complete cycles transmitted for a specific base waveform. The repetitions may enhance the SNR for the waveforms, when the waveforms are stacked properly. Accordingly, the waveforms may be repeated as long as possible to improve the SNR. For instance, the base waveform may be repeated between 4 and 1024 times for the frequency band of about 0.01 Hz to about 10 Hz when a non-stationary transmitter is utilized. With these parameters, the total proposed time interval T may be calculated for the proposed compound waveform, as shown in block 717. The total proposed time interval T may be the period of time that the base waveforms perform the various cycles. This total proposed time interval T may be calculated by summing up the total time utilized by each base waveform for example. If the total proposed time interval T is greater than the compound waveform time interval $T_{max}$, then the base waveforms may be adjusted by selecting another waveform type or modifying different parameters, such as the number of repetitions of each base waveform, survey objectives parameters, low frequency, frequency spectrum, and technical parameters, as shown in blocks 708-716. However, if the total proposed time interval T is less than or equal to the compound waveform time interval $T_{max}$, then the compound waveform with the base waveforms may be generated in block 720, which may be similar to blocks 610-614 of FIG. 6. The generation of the compound waveform may include storing the compound waveform or programming the compound waveform into a computer or the transmitter 102.

Beneficially, the present techniques provide high quality geophysical survey data because base waveforms may be modified to form compound waveforms. Further, the present techniques provide flexibility in the configuration of the transmitter to provide different base waveforms to accommodate specific survey objectives, such as specific target depths and subterranean regions. Finally, the present techniques enhance hydrocarbon exploration to provide higher quality or specific data for onshore or offshore CSEM applications.

As a specific example of the process in FIG. 7, a geophysical survey may be configured to collect data for a survey line for a specific subterranean region, such as the subterranean region in FIG. 5. These frequencies may have spatial sampling rate $S_r$ of about $\frac{1}{200}$ m, transmitter towing speed v of about 1.5 knots, and the number of repetitions being set to 16. Accordingly, the calculation of the length of the compound waveform, which is the compound waveform time interval $T_{max}$ discussed in block 706, is shown below:

$$T_{max} = \frac{1}{(S_r * v)} = \frac{1}{\left(\frac{1}{200} * \frac{1.5 * 1853}{3600}\right)} \approx 260 \text{ (sec)}.$$

Following the calculation of length of the compound waveform, the low frequency $f_{low}$ may be determined, which is discussed in block 710, as shown below:

$$f_{low} = \frac{\rho}{\pi\mu_0 D^2} \approx \left(\frac{503}{D}\right)^2$$

$$\rho = \left(\frac{503}{2000}\right)^2 * 1.0 \approx \frac{1}{16} = 0.0625 \text{ (Hz)}.$$

where the target depth D is 2 km and the overburden resistivity $\rho$ is 1 Ohm-m.

With the low frequency $f_{low}$ calculated, the number of frequencies and their distribution may be selected. For this example, the top target is about one skin depth at 1.0 Hz. Accordingly, the frequencies of 2.0 Hz, 1.0 Hz, 0.5 Hz, 0.25 Hz, 0.125 Hz and 0.0625 Hz may be selected. With these frequencies, the high frequency of 2.0 Hz may be utilized to constrain the overburden, while the frequencies of 0.5 and 0.25 Hz may be utilized for depths between two resistive layers.

To select the base waveforms, as discussed in block 714, a sinusoidal base waveform may be utilized based on experience with a particular subterranean region. Accordingly, because the number of repetitions is set to 16, the total proposed time interval T for the compound waveform may be about 504 seconds, as explained below. In this example, the total time interval $T_{SinCW}$ is the total proposed time interval T for the sinusoidal compound waveform. This total time interval $T_{SinCW}$ is the sum of 16 cycles for each frequency, which is further discussed in FIG. 8A.

Figure 8A:
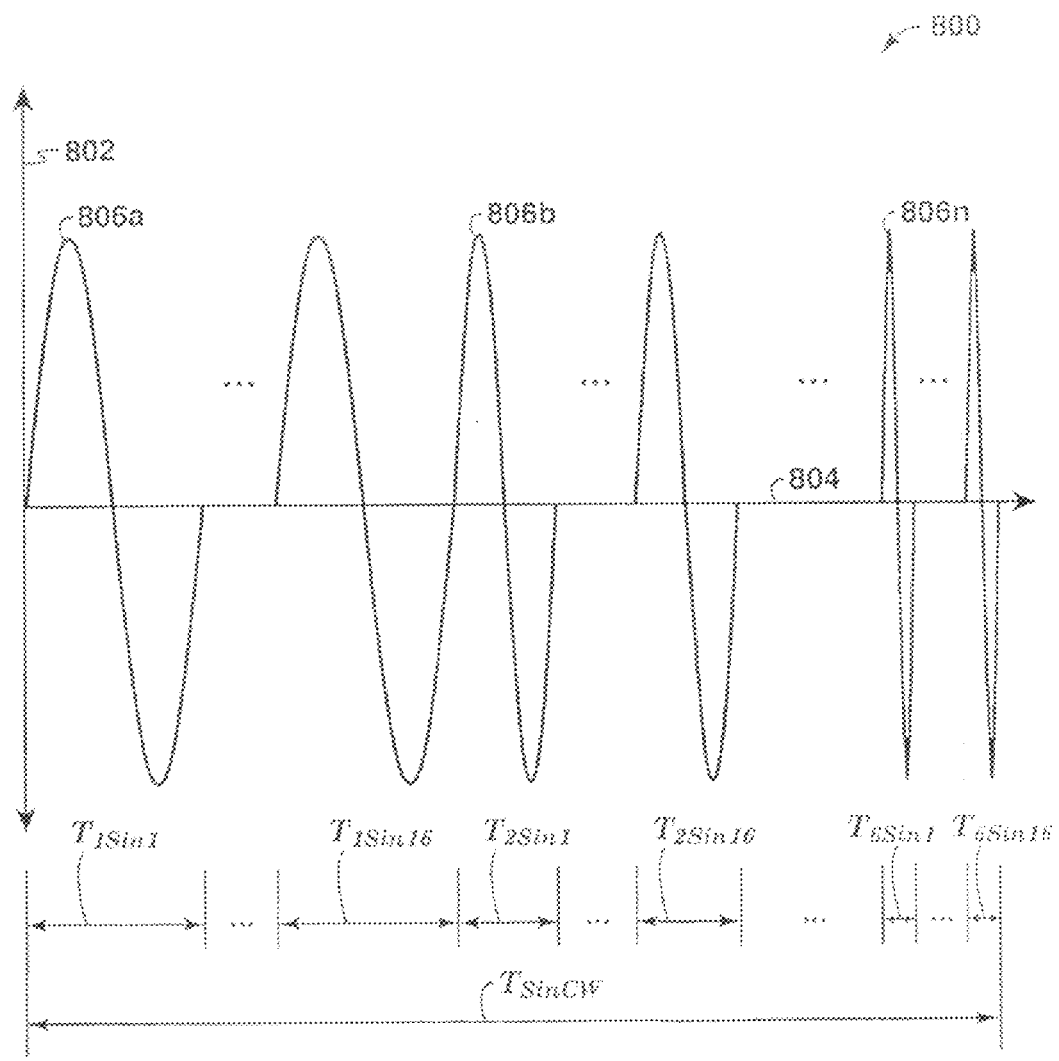
FIGS. 8A-8C are exemplary charts of waveforms utilized in the process of FIG. 6 in accordance with the present techniques.

In FIG. 8A, which may be referred to by reference numeral 800, the amplitude 802 of sinusoidal base waveforms 806a-806n are shown against time 804. In this example, the number of repetitions may be set to 16 with the frequencies being 0.0625 Hz, 0.125 Hz, 0.25 Hz, 0.5 Hz, 1.0 Hz and 2.0 Hz. Accordingly, first base waveform time intervals $T_{1Sin1}$-$T_{1Sin16}$, which may each be about 16 seconds, represent the time intervals for the sinusoidal waveform 806a to complete sixteen cycles at the first frequency of 0.0625 Hz. Similarly, the second base waveform time intervals $T_{2Sin1}$-$T_{2Sin16}$, which each may be about 8 seconds, represent the time intervals for the sinusoidal waveform 806b to complete sixteen cycles at the second frequency of 0.125 Hz. This continues until the last base waveform time intervals $T_{6Sin1}$-$T_{6Sin16}$, which each may be about 0.5 seconds and represent the time intervals for the sinusoidal waveform 806n to complete sixteen cycles at the sixth frequency of 2.0 Hz. As a result, the compound waveform may have a total time interval $T_{SinCW}$ of about 504 seconds to complete the cycles for each of the frequencies. Accordingly, the total time interval $T_{SinCW}$ for the sinusoidal base waveforms exceeds the compound waveform time interval $T_{max}$, which is about 260 sec.

Because the total time interval $T_{SinCW}$ for the sinusoidal base waveforms 806a-806n exceeds the compound waveform time interval $T_{max}$, the process is again performed with another type of waveform. In block 714, a tripeak waveform may be selected as the base waveform. With this selection, two tripeak base waveforms, which have cycles of 16 seconds and 2 seconds, may be utilized as the base waveforms. These tripeak waveforms are shown in greater detail in FIG. 8B.

Figure 8B:
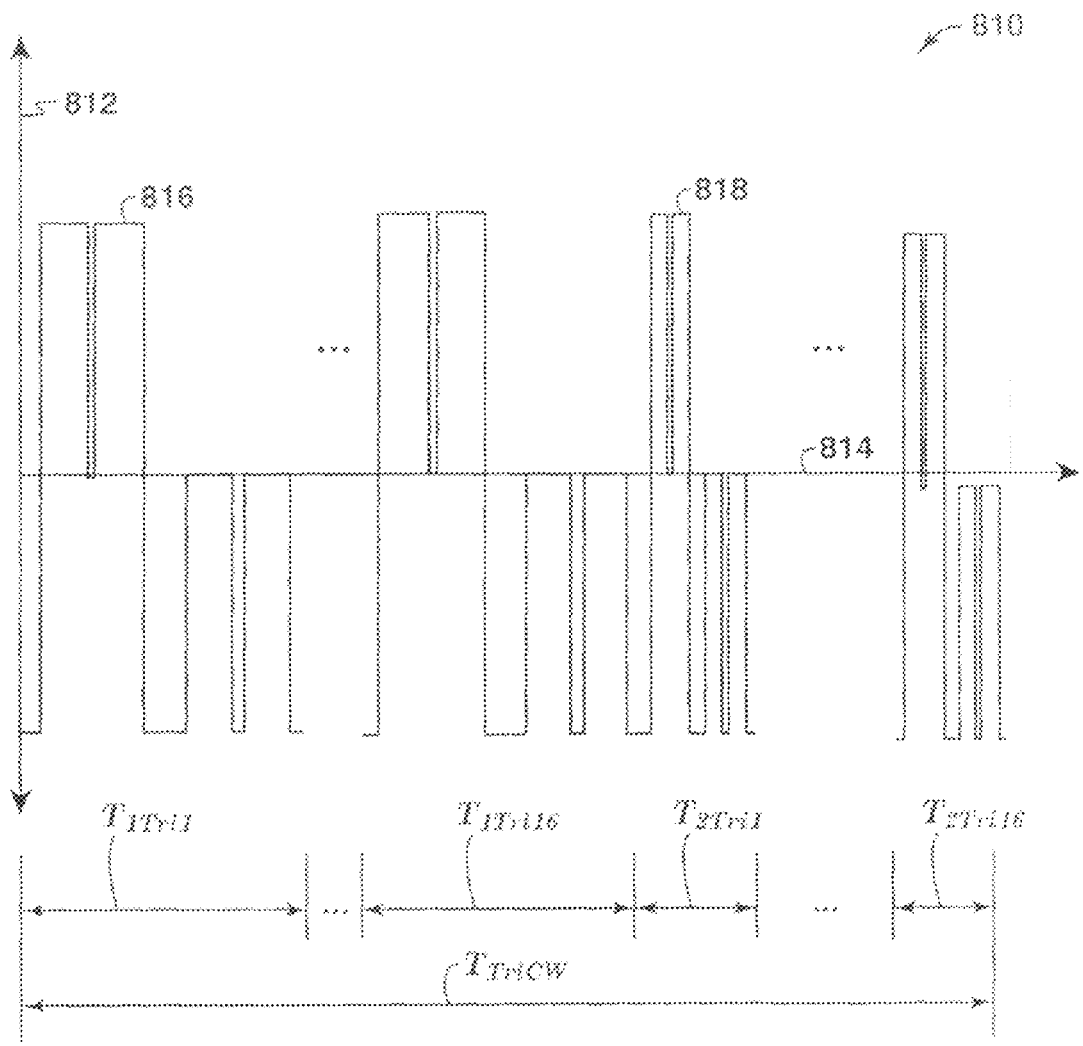

In FIG. 8B, which may be referred to by reference numeral 1810, the amplitude 812 of tripeak base waveforms 816 and 818 is shown against time 814. In this example, the number of repetitions may be set to 16 with the fundamental tripeak frequencies being 0.0625 Hz and 0.5 Hz. Accordingly, first tripeak time intervals $T_{1Tri1}$-$T_{1Tri16}$, which may each be about 16 seconds, represent the time intervals for the tripeak waveforms to complete sixteen cycles at the first fundamental frequency of 0.0625 Hz. Similarly, the second tripeak time intervals $T_{2Tri1}$-$T_{2Tri16}$, which may each be about 2 seconds, may represent the time intervals for the tripeak waveforms to complete sixteen cycles at the second fundamental frequency of 0.5 Hz. The compound waveform has a total time interval $T_{TriCW}$ of about 288 seconds to complete the repetitions for each of the frequencies of the base tripeak waveforms. Thus, the total time interval $T_{TriCW}$ is about 288 seconds, which is slightly longer than the compound waveform time interval $T_{max}$, which is 260 seconds.

Accordingly, the process may again return to block 714. In this block 714, another base waveform may be selected or another parameter may be adjusted to reduce the total time interval to be less than the compound waveform time interval $T_{max}$. For instance, considering transmitter power, receiver sensitivity, and estimated background noise level, an alternative base waveform, such as the sinusoidal, square, Cox, tripeak waveforms, may be utilized because the power becomes too low for frequencies of quadpeak and pentapeak waveforms. Alternatively, the parameters (i.e. towing speed v, spatial sampling rate, the number of repetition, the desired spectrum, etc.) may be modified to create a compound waveform that satisfies the compound waveform time interval $T_{max}$. If the number of repetitions are adjustable, one implementation using the tripeak waveform is to transmit fourteen repetitions of a 0.0625 Hz tripeak waveform for 224 seconds and sixteen repetitions of a 0.5 Hz tripeak waveform for 32 seconds, as shown in FIG. 8C.

Figure 8C:
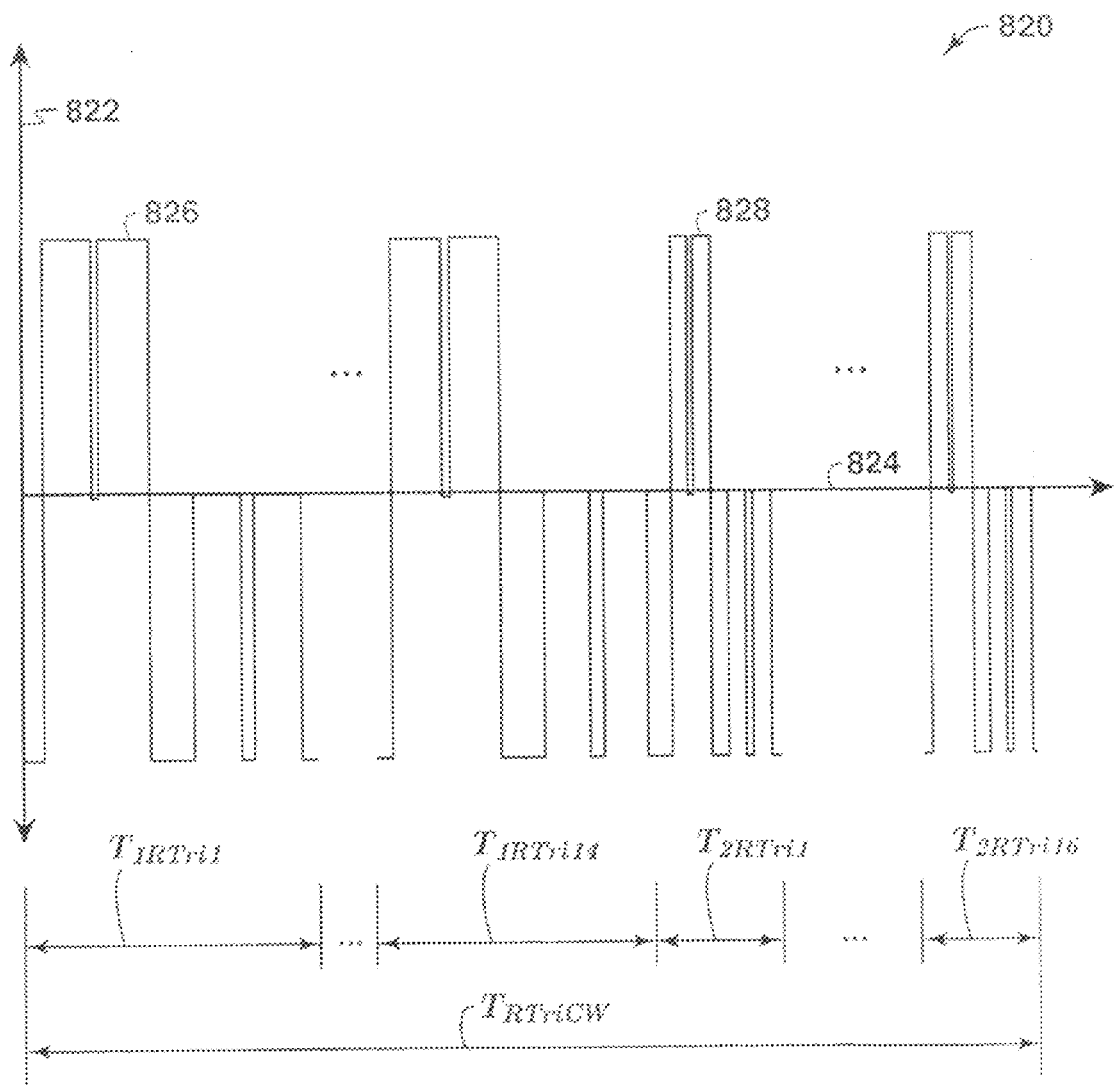

In FIG. 8C, which may be referred to by reference numeral 820, the amplitude 822 of two tripeak base waveforms 826 and 828 are shown against time 824. In this example, the number of repetitions may be set to 14 for the 0.0625 Hz tripeak waveform and to 16 for the 0.5 Hz tripeak waveform. Accordingly, first refined tripeak time intervals $T_{1RTri1}$-$T_{1RTri14}$, which may each be about 16 seconds, represent the time intervals for the tripeak waveforms to complete fourteen cycles at the first fundamental frequency of 0.0625 Hz. Similarly, the second refined tripeak time intervals $T_{2RTri1}$-$T_{2RTri16}$, which may each be about 2 seconds, may represent the time intervals for the tripeak waveforms to complete sixteen cycles at the last fundamental frequency of 0.5 Hz. As a result, the compound waveform may have a total time interval $T_{RTriCW}$ of about 256 seconds to complete the cycles for each of the frequencies. Because this total time interval $T_{RTriCW}$ is less than or equal to the compound waveform time interval $T_{max}$, this compound waveform may be utilized for the geophysical survey, provided the frequency spectrum of the compound waveform is acceptable.

As can be appreciated, the base waveforms may be adjusted with various parameters with different results that are based on specific objectives for the survey in alternative embodiments. For example, the number of repetitions may be adjusted for a compound waveform to provide additional data by specifically modifying the time allocated to each base waveform. That is, the total time interval T for this compound waveform may be adjusted by modifying the number of repetitions for each base waveform to be within the compound waveform time interval $T_{max}$.

Figure 9:
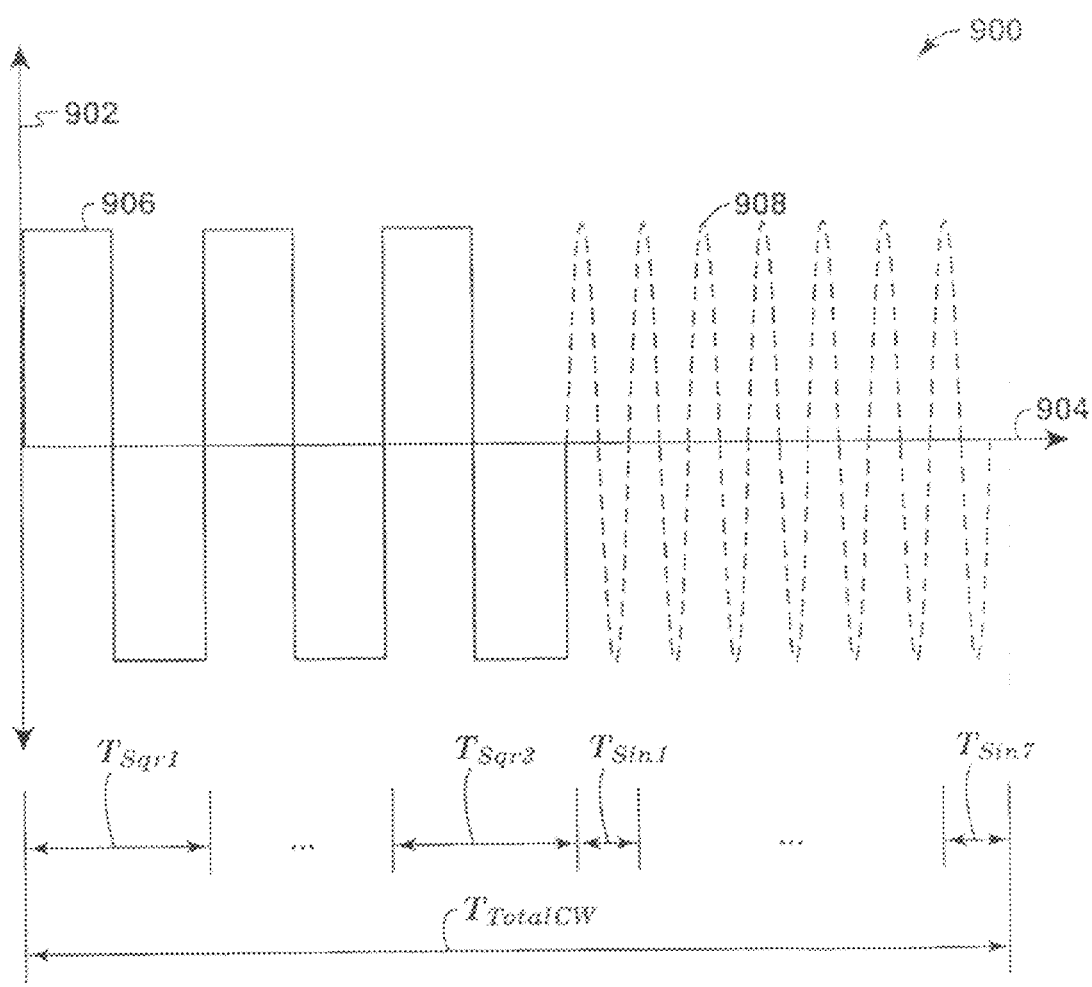
FIG. 9 is an exemplary chart of a compound waveform utilizing different types of base waveforms in accordance with the present techniques.

In addition to using a single type of base waveform, multiple types of waveforms may also be utilized. For example, as shown in FIG. 9, which may be referred to by reference numeral 900, the amplitude 902 of a square wave base waveform 906 and a sinusoidal base waveform 908 are shown against time 904. In this example, the number of repetitions for the square wave base waveform 906 may be set to 3, while the number of repetitions for the sinusoidal base waveform 908 is set to 7. Accordingly, first base waveform time intervals $T_{Sqr1}$-$T_{Sqr3}$ may represent the time intervals for the square wave base waveform 906 to complete the three cycles, while second base waveform time intervals $T_{Sin1}$-$T_{Sin7}$ may represent the time intervals for the sinusoidal base waveform 908 to complete seven cycles. As a result, the compound waveform may have a total time interval $T_{TotalCW}$ that is the sum of the first base waveform time intervals $T_{Sqr1}$-$T_{Sqr3}$ and the second base waveform time intervals $T_{Sin1}$-$T_{Sin7}$.

Further, as another enhancement, the receivers or data processing devices may be configured to utilize the compound waveforms that generated the obtained geophysical data. By separately correlating these received base waveforms with the corresponding transmitted base waveforms, spectral decomposition may be selected by dividing the time series data into separate portions according to: the base waveforms within the transmitted compound waveform. In this manner, the geophysical data may be further clarified.

Figure 10A:
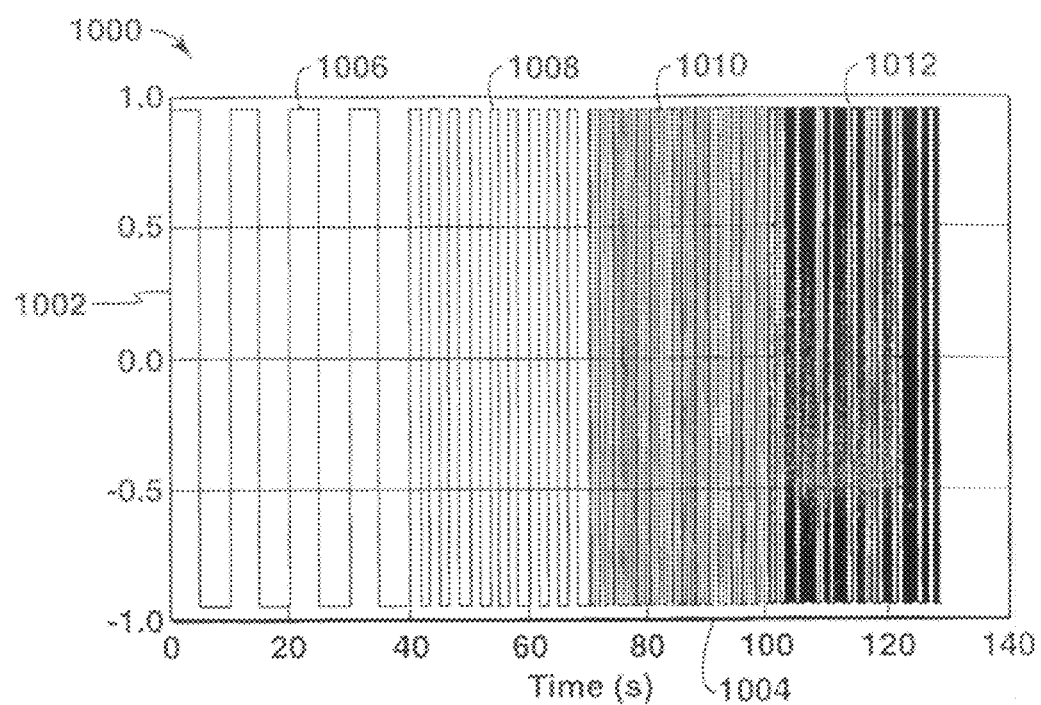
FIGS. 10A and 10B are exemplary charts of a compound waveform utilizing different frequencies to amplify base waveforms in accordance with the present techniques.
Figure 10B:
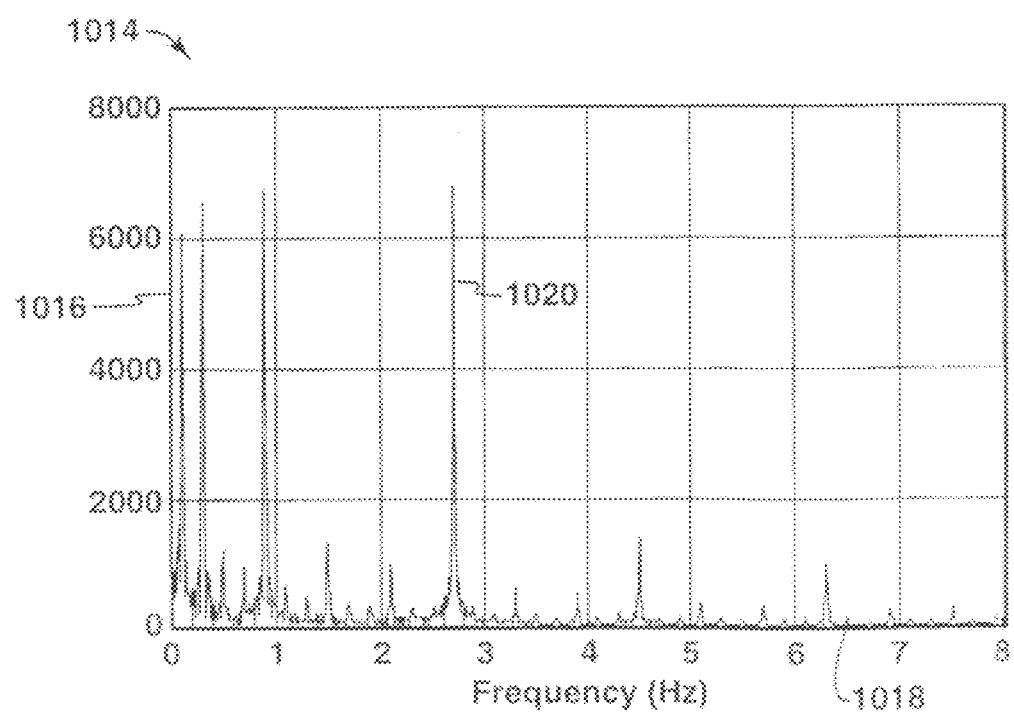

Also, as another alternative embodiment, the base waveforms may be configured to phase-match, thereby enhancing the amplitudes within the overall spectrum of the compound waveform. That is, the harmonics of the base waveform may be phase-matched with other base waveforms in the compound waveform to improve amplitudes of the other base waveforms. For example, as shown in FIGS. 10A and 10B, a compound waveform utilizing different frequencies to amplify base waveforms in accordance with the present techniques is shown. In FIG. 10A, which may be referred to by reference numeral 1000, the amplitude 1002 of square wave base waveforms 1006, 1008, 1010 and 1012 are shown against time 1004. In this example, the frequencies of square wave base waveforms 1006, 1008, 1010 and 1012 are 0.1 Hz, 0.3 Hz, 0.9 Hz and 2.7 Hz. The higher frequencies are selected to match the harmonics provided by the lower frequency waveforms. This makes efficient use of the harmonic energy for the spectrum of the compound waveform. To ensure that the higher-frequency subsequences are in-phase with these harmonic(s), the subsequences are constrained to have a duration equal to an integer number of periods of the fundamental frequency (i.e. multiples of 10 seconds in this example) and further constrained to start with a positive up-cycle (i.e. to have no phase shift relative to other subsequences). The number of the periods may be selected within these constraints to obtain the desired relative strength at each frequency, which are shown in FIG. 10B.

In FIG. 10B, which may be referred to by reference numeral 1014, the amplitude spectrum 1016 of square wave base waveforms 1006, 1008, 1010 and 1012, which are referred to by waveform 1020, is shown against frequency 1018. In continuing with the previous example, the subsequences have lengths of the waveforms 1006, 1008, 1010 and 1012 that may be 40, 30, 30 and 30 seconds, respectively. By utilizing these lengths for the waveforms 1006, 1008, 1010 and 1012, the spectral amplitudes are balanced as shown in FIG. 10B. As such, these waveforms 1006, 1008, 1010 and 1012 of FIG. 10A may be repeated along the survey line for the geophysics survey with a corresponding simplification of the data processing.

Figure 11:
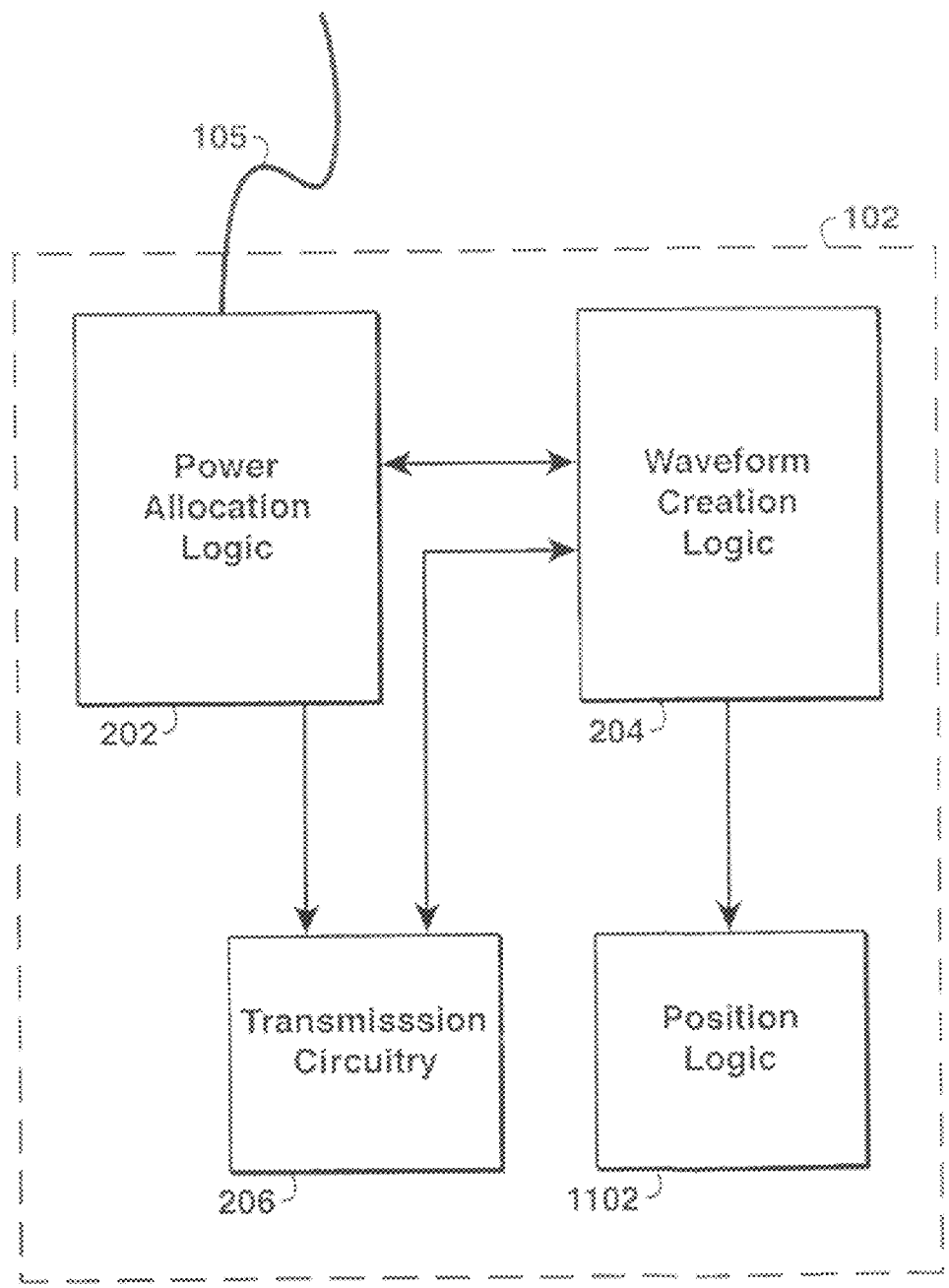
FIG. 11 is an exemplary block diagram of a transmitter with position logic utilized in the CSEM geophysical surveying system of FIG. 1.

As an alternative embodiment of the transmitter, other logic may be utilized with or in the transmitter. For example, position logic may be utilized to determine the position of the transmitter, as shown in FIG. 11. FIG. 11 is an exemplary block diagram of a transmitter with position logic utilized in the CSEM geophysical surveying system 100 of FIG. 1. In FIG. 11, the transmitter 102 may include various components, such as power allocation logic 202, waveform creation logic 204 and transmission circuitry 206, which are previously discussed in FIG. 2. However, in this embodiment, position logic 1102 may be included to provide parameters to the waveform creation logic 204 to modify the compound waveform or manage the generation of the compound waveform.

The position logic 1102 may be utilized to determine the position of the transmitter 102, which may be utilized to modify the compound waveform or manage the generation of the compound waveform. Similar to the other logic, the position logic 1102 may include software components, hardware components, and/or a combination thereof. For example, the position logic 1102 may include a global positioning system (GPS) coupled to a position component within transmitter 102. In this configuration, the position component may be coupled to the power allocation logic 202 to receive power and to the waveform creation logic 204 to provide location related parameters to the waveform creation logic 204. The GPS of the position logic 1102 may determine position of the transmitter 102 from signals received via a GPS satellite/receiver located on the survey ship 104 and attached to the position component via the cable 105. As such, the transmitter may include position logic 1102 or other logic that is utilized to modify the compound waveforms.

Figure 12:
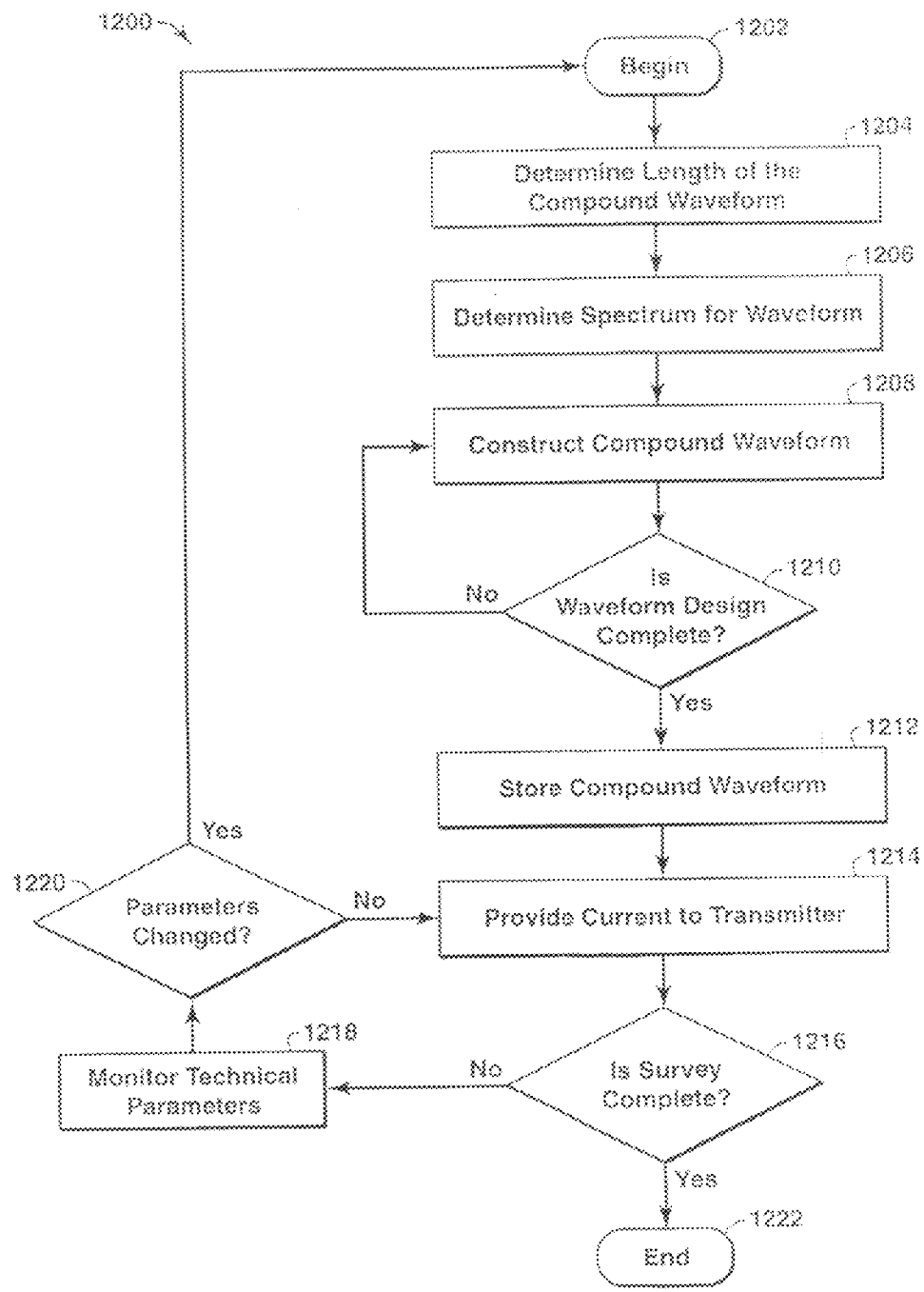
FIG. 12 is an exemplary flow chart of the construction of a compound waveform during the geophysical survey for the geophysical survey system of FIG. 1 in accordance with aspects of the present techniques.

In an alternative embodiment, the compound waveform may be modified or created by the transmitter based on parameters or survey objectives. These parameters and/or survey objectives may be provided to the transmitter or stored on the transmitter 102 prior to the operation of the geophysical survey. FIG. 12 is an exemplary flow chart of the construction of a compound waveform during the geophysical survey for the geophysical survey system of FIG. 1 in accordance with aspects of the present techniques. This flow chart, which is referred to by reference numeral 1200, may be best understood by concurrently viewing FIGS. 1, 2 and 6. In this flow chart 1200, the compound waveform may be automatically adjusted to compensate for changes with various parameters. This dynamic adjustment of the compound waveform provides the flexibility to the system to maintain specific survey objectives.

The flow chart begins at block 1202. At blocks 1204-1214, the determinations and constructions of the compound waveforms may be the same or similar to the blocks 604-614, respectively. However, in this flow chart 1200, a determination is made whether the survey is complete, as shown in block 1216. If the survey is not complete, the various technical parameters may be monitored at block 1218. At block 1218, the technical parameters may be analyzed to determine, whether the technical parameters have changed and the survey objectives have been violated. If the technical parameters have not changed, then the compound waveform may be generated at block 1214. However, if the technical parameters have changed, then the process of determining the compound waveform may begin at block 1204. For instance, if the technical parameter is the velocity v of the survey ship 104, when it exceeds a predetermined threshold, the compound waveform may be recalculated. Regardless, if the survey is complete, the process ends at block 1222.

While the present techniques of the invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

What is claimed is:

1. A method of constructing a signal for a source along a geophysical survey line for a controlled source electromagnetic survey comprising:
   determining a first waveform and a second waveform, the first waveform and second waveform related to a combined frequency spectrum and bandwidth associated with a geophysical survey line;
   determining a specific time interval for the compound waveform associated with the geophysical survey line;
   constructing a signal by a sequencing comprising sequencing the first waveform with the second waveform, thereby constructing a compound waveform having said combined frequency spectrum and bandwidth;
   calculating a proposed time interval for the compound waveform;
   adjusting the compound waveform if the proposed time interval is greater than the specific time interval; and
   repeating the signal over one or more different time intervals along the geophysical survey line.

2. The method of claim 1 wherein the combined frequency spectrum and bandwidth are configured to explore a preselected range of target depths.

3. The method of claim 1 wherein sequencing comprises alternating the first waveform and the second waveform.

4. The method of claim 1, further comprising determining a third waveform and constructing the signal to sequence the third waveform along with the first waveform and the second waveform.

5. The method of claim 1, further comprising determining two or more waveforms and constructing the signal to sequence the two or more waveforms along with the first waveform and the second waveform.

6. The method of claim 1 wherein each of the first waveform and the second waveform comprises at least one waveform type that is one of a sinusoidal waveform, square waveform, tripeak waveform, quad waveform, pentapeak waveform and any combination thereof.

7. The method of claim 6 wherein the first waveform is a first waveform type from the at least one waveform type and the second waveform is a second waveform type from the at least one waveform type.

8. The method of claim 6 wherein the first waveform and the second waveform are the same waveform type from the at least one waveform type.

9. The method of claim 8 wherein the first waveform is set to a first frequency content and the second waveform is set to a second frequency content, wherein the first frequency content and the second frequency content are different.

10. The method of claim 1 wherein the first waveform is set to a first frequency content and the second waveform is set to a second frequency content.

11. The method of claim 1 wherein the first waveform and the second waveform are sequenced along one of a plurality of spatial sections along the geophysical survey line.

12. The method of claim 1 wherein the combined frequency spectrum for the compound waveform includes a low frequency which is determined by steps comprising:
   obtaining at least one survey objective parameter; and
   determining the low frequency for the compound waveform based on the at least one survey objective parameter.

13. The method of claim 12 wherein the combined frequency spectrum for the compound waveform comprises a set of frequencies, wherein the set of frequencies include the low frequency along with at least one other frequency.

14. The method of claim 13 wherein the at least one other frequency is selected to resolve ambiguities in inversions of earth resistivity.

15. The method of claim 12 wherein the at least one survey objective parameter comprises one of a target depth of subterranean regions, resistivity of an overburden and a combination thereof, and the low frequency for the compound waveform is determined based on the skin depth effect.

16. A transmitter for constructing a compound waveform for a source along a geophysical survey line for a controlled source electromagnetic survey comprising:
   an antenna; and
   waveform creation logic coupled to the antenna and configured to:
      provide a plurality of base waveforms, wherein the plurality of base waveforms are related to a combined frequency spectrum and bandwidth associated with a geophysical survey line;
      determine or read from input a specific time interval for the compound waveform associated with the geophysical survey line;

construct a compound waveform having a specific time interval by sequencing the plurality of base waveforms;
calculate a proposed time interval for the compound waveform;
adjust the compound waveform if the proposed time interval is greater than the specific time interval; and
repeat the compound waveform at another time interval along the geophysical survey line.

17. The transmitter of claim 16 wherein the combined frequency spectrum and bandwidth are configured to explore a pre-selected range of target depths.

18. The transmitter of claim 16 wherein the plurality of base waveforms is provided from memory associated with the waveform creation logic.

19. The transmitter of claim 18 wherein the plurality of base waveforms are stored in the memory prior to deployment of the transmitter.

20. The transmitter of claim 16 wherein the waveform creation logic is configured to:
determine the combined frequency spectrum for the compound waveform.

21. The transmitter of claim 20 wherein the specific time interval for the compound waveform is associated with one of a plurality of spatial sections along the geophysical survey line.

22. The transmitter of claim 16 wherein the waveform creation logic is further configured to:
select the plurality of base waveforms from a plurality of waveform types; and
obtain a repetition setting for each of the plurality of base waveforms in the compound waveform.

23. The transmitter of claim 22 wherein the waveform creation logic is further configured to:
provide the compound waveform to the antenna if the proposed time interval is less than or equal to the specific time interval for the compound waveform.

24. The transmitter of claim 16 comprising power allocation logic coupled to the waveform creation logic and antenna and configured to distribute power to the waveform creation logic and antenna.

25. The transmitter of claim 16 wherein the plurality of base waveforms comprises one of sinusoidal waveforms, square waveforms, tripeak waveforms, quadpeak waveforms, pentapeak waveforms and any combination thereof.

26. A system for conducting a controlled source electromagnetic survey with a compound waveform for a source along a geophysical survey line comprising:
a vessel coupled to a transmitter via a cable, the transmitter comprising:
a transmission circuitry; and
waveform creation logic coupled to the transmission circuitry and configured to:
provide a plurality of base waveforms, wherein the plurality of base waveforms are related to a combined frequency spectrum and bandwidth associated with a geophysical survey line;
determine or read from input a specific time interval for the compound waveform associated with the geophysical survey line:
construct a compound waveform having a specific time interval by sequencing the plurality of base waveforms;
calculate a proposed time interval for the compound waveform;
adjust the compound waveform if the proposed time interval is greater than the specific time interval; and
repeat the compound waveform at another time interval along the geophysical survey line; and
at least one receiver configured to detect the compound waveform.

27. The system of claim 26 wherein the combined frequency spectrum and bandwidth is configured to explore a pre-selected range of target depths.

28. The system of claim 26 wherein the plurality of base waveforms are provided from memory associated with the waveform creation logic.

29. The system of claim 28 wherein the plurality of base waveforms are stored in the memory prior to deployment of the transmitter.

30. The system of claim 26 wherein the waveform creation logic is configured to:
determine the combined frequency spectrum for the compound waveform.

31. The system of claim 26, wherein the transmitter is configured to:
obtain at least one technical parameter from the vessel; and
calculate the specific time interval for the compound waveform from the at least one technical parameter.

32. The system of claim 31 wherein the at least one technical parameter comprises at least one of the velocity of the vessel, a spatial sampling rate and a combination thereof.

33. The system of claim 32 wherein the specific time interval for the compound waveform is associated with one of a plurality of spatial sections along the geophysical survey line.

34. The system of claim 30 wherein the waveform creation logic is further configured to:
select the plurality of base waveforms from a plurality of waveform types; and
obtain a repetition setting for each of the plurality of base waveforms in the compound waveform.

35. The system of claim 26, wherein the waveform creation logic is further configured to:
provide the compound waveform to the transmission circuitry for transmission to the at least one receiver if the proposed time interval is less than or equal to the specific time interval for the compound waveform.

36. The system of claim 26 comprising power allocation logic coupled to the waveform creation logic and transmission circuitry and configured to distribute power from the vessel via the cable to the waveform creation logic and antenna.

37. The method of claim 1, wherein said constructing a compound waveform comprises:
using durations and gaps set such that the compound waveform has a spectral content selected based on said combined frequency spectrum and bandwidth.

38. The method of claim 1, wherein constructing the compound waveform comprises determining a number of repetitions in the compound waveform for each of the first waveform and the second waveform.

39. The method of claim 1, wherein the controlled source electromagnetic survey is conducted in water using a moving vessel to tow the source along the geophysical survey line, and wherein the specific time interval for the compound waveform is determined from the vessel's speed and a selected spatial sampling rate for receiver data.

* * * * *